(12) United States Patent
Hatanaka

(10) Patent No.: US 9,199,164 B2
(45) Date of Patent: Dec. 1, 2015

(54) IMAGE DISPLAY DEVICE, COMPUTER READABLE STORAGE MEDIUM, AND GAME CONTROL METHOD

(75) Inventor: Tetsuo Hatanaka, Tokyo (JP)

(73) Assignee: KONAMI DIGITAL ENTERTAINMENT CO., LTD., Tokyo (JP)

(*) Notice: Subject to any disclaimer, the term of this patent is extended or adjusted under 35 U.S.C. 154(b) by 386 days.

(21) Appl. No.: 13/879,881

(22) PCT Filed: Oct. 12, 2011

(86) PCT No.: PCT/JP2011/005714
§ 371 (c)(1),
(2), (4) Date: Apr. 17, 2013

(87) PCT Pub. No.: WO2012/056636
PCT Pub. Date: May 3, 2012

(65) Prior Publication Data
US 2013/0231184 A1    Sep. 5, 2013

(30) Foreign Application Priority Data

Oct. 27, 2010   (JP) ................................. 2010-240334

(51) Int. Cl.
| | |
|---|---|
| *H04N 13/00* | (2006.01) |
| *A63F 13/00* | (2014.01) |
| *A63F 13/837* | (2014.01) |
| *A63F 13/219* | (2014.01) |
| *A63F 13/5252* | (2014.01) |
| *A63F 13/04* | (2006.01) |

(Continued)

(52) U.S. Cl.
CPC ................. *A63F 13/00* (2013.01); *A63F 13/04* (2013.01); *A63F 13/06* (2013.01); *A63F 13/213* (2014.09);
(Continued)

(58) Field of Classification Search
CPC ........... H04N 13/0022; H04N 13/0497; A63F 13/00; A63F 13/837; A63F 13/219; A63F 13/5252; A63F 13/04; A63F 13/06; A63F 13/213; G06T 15/20; G06F 3/017
See application file for complete search history.

(56) References Cited

U.S. PATENT DOCUMENTS

| 6,278,418 B1 | 8/2001 | Doi |
| 2007/0200847 A1* | 8/2007 | Rossler ................... G06F 3/011 345/419 |

(Continued)

FOREIGN PATENT DOCUMENTS

| CA | 101808250 A | 8/2010 |
| CN | 101247530 A | 8/2008 |

(Continued)

OTHER PUBLICATIONS

International Search Report of corresponding International Application No. PCT/JP2011/005714, dated on Nov. 15, 2011.

(Continued)

*Primary Examiner* — Jefferey Harold
*Assistant Examiner* — Sean Haiem
(74) *Attorney, Agent, or Firm* — Global IP Counselors, LLP

(57) ABSTRACT

An image display device of an embodiment includes an image display means for displaying a parallax image on a display screen, a first coordinate calculating means for calculating virtual spatial coordinates of a stereoscopic image recognized by a viewer of the parallax image, a second coordinate calculating means for calculating spatial coordinates of an operating body to be operated by the viewer, and an event generating means. The event generating means generates a certain event accompanying a change of at least one of the parallax image or an image on the display screen other than the parallax image when a distance between the spatial coordinates of at least one point of the stereoscopic image calculated by the first coordinate calculating means and the spatial coordinates of at least one point of the operating body calculated by the second coordinate calculating means is equal to or less than a certain threshold.

16 Claims, 12 Drawing Sheets

(51) Int. Cl.
*A63F 13/06* (2006.01)
*A63F 13/213* (2014.01)
*G06T 15/20* (2011.01)
*G06F 3/01* (2006.01)
*A63F 13/20* (2014.01)
*H04N 13/04* (2006.01)

(52) U.S. Cl.
CPC ........... *A63F 13/219* (2014.09); *A63F 13/5252* (2014.09); *A63F 13/837* (2014.09); *G06F 3/017* (2013.01); *G06T 15/20* (2013.01); *H04N 13/0022* (2013.01); *H04N 13/0497* (2013.01); *A63F 2300/1093* (2013.01); *A63F 2300/8076* (2013.01)

(56) References Cited

U.S. PATENT DOCUMENTS

| | | | |
|---|---|---|---|
| 2008/0199070 A1 | 8/2008 | Kim et al. | |
| 2008/0246757 A1* | 10/2008 | Ito | G06T 15/10 345/419 |
| 2009/0077504 A1* | 3/2009 | Bell | G06F 3/011 715/863 |
| 2012/0038631 A1* | 2/2012 | Mayhew | G06F 3/04815 345/419 |

FOREIGN PATENT DOCUMENTS

| | | |
|---|---|---|
| JP | 07-222866 | 8/1995 |
| JP | 09-237353 A | 9/1997 |
| JP | 2000-184398 A | 6/2000 |
| JP | 2001-101256 A | 4/2001 |
| JP | 2003-085593 A | 3/2003 |

OTHER PUBLICATIONS

Japanese Office Action of corresponding Japanese Patent Application No. 2010-240334, dated on Nov. 8, 2011.

Chinese Office Action issued in Chinese Patent Application No. 201180049359 dated Dec. 4, 2014.

* cited by examiner

IMAGE DISPLAY DEVICE, COMPUTER READABLE STORAGE MEDIUM, AND GAME CONTROL METHOD

CROSS-REFERENCE TO RELATED APPLICATIONS

This U.S. National stage application claims priority under 35 U.S.C. §119(a) to Japanese Patent Application No. 2010-240334, filed on Oct. 27, 2010, the entire contents of which are incorporated herein by reference.

FIELD OF THE INVENTION

The present invention relates to information processing technology that displays a two-dimensional parallax image to allow a virtual stereoscopic image to be recognized by a viewer and utilize the virtual stereoscopic image.

DESCRIPTION OF THE RELATED ART

A technology is known in the prior art that displays a two-dimensional parallax image to allow a virtual stereoscopic image to be recognized by a viewer. For example, Patent Document 1 discusses a stereoscopic image game device as an image display device that displays a right eye image and a left eye image in a spatial modulation element, displays a facial profile obtained from an image of a player (viewer), and allows a right eye image or a left eye image to be viewed only by the right eye or the left eye of the player through a lens as an illumination of the facial profile. According to this device, specialized glasses having the function of separating each of the images for the right and left eyes to allow the player to recognize a stereo image (stereoscopic image) are made unnecessary.

PRIOR ART DOCUMENTS

Patent Document 1: Japanese Patent Laid-open No. 1995-222866

SUMMARY OF THE INVENTION

Technical Problem

According to the abovementioned conventional device, although a stereoscopic image can be recognized by a viewer without wearing specialized glasses, no device has existed in the prior art that would allow a viewer to achieve feeling of being able to perform a direct operation on the stereoscopic image.

In view of the above, an object of the present invention is to provide an image display device, a game program, and a game control method that allows a viewer of the image display device to be able to obtain feeling as if directly performing an operation on a stereoscopic image that does not actually exist.

Solution to the Problem

An image display device of the present invention includes an image display means for displaying a parallax image on a display screen; a first coordinate calculating means for calculating virtual spatial coordinates of a stereoscopic image to be recognized by a viewer of the parallax image; a second coordinate calculating means for calculating virtual spatial coordinates of an operating body to be operated by the viewer; and an event generating means for generating a certain event accompanying a change of at least one of the parallax image or an image on the display screen other than the parallax image when a distance between the spatial coordinates of at least one point of the stereoscopic image calculated by the first coordinate calculating means and the spatial coordinates of at least one point of the operating body calculated by the second coordinate calculating means is equal to or less than a certain threshold.

When a viewer who sees a parallax image displayed by the image display device sees an image for the left eye in the parallax image with the left eye while seeing an image for the right eye in the parallax image with the right eye, the presence of a virtual stereoscopic image between the viewer and the display screen is recognized by the viewer. The first coordinate calculating means calculates the virtual spatial coordinates of the stereoscopic image.

The image display device presumes that the viewer has an operating body to be operated for performing an operation on the stereoscopic image. The operating body may be a physical substance separate from the viewer such as a long and narrow rod-like pen and the like, or alternatively may be a physical substance that is a portion of the viewer such as a hand or finger and the like of the viewer. The second coordinate calculating means calculates the spatial coordinates of the above operating body.

The event generating means of the image display device generates a certain event when it is determined that the operating body that is the operation object of the viewer is sufficiently close to or touches the stereoscopic image recognized by the viewer. The certain event is an event that accompanies a change of at least one of the above parallax image or an image on the display screen other than the parallax image, or in other words, an event that accompanies a change of the stereoscopic image recognized by the viewer and/or a two-dimensional image on the display screen, so that the change can be then seen by the viewer. As a result, according to the image display device, the viewer is able to experience feeling as if being able to directly perform an operation on the stereoscopic image that does not actually exist.

For example, it may be assumed that the image display device is applied to a game device that controls the progress of a game in which a player performs an operation on a stereoscopic image virtually recognized by the player as an object. The game progresses, for example, by providing motivation to the player to use the operating body (e.g., a pen and the like) to seemingly touch or move the operating body sufficiently close to the stereoscopic image recognized by the player. The event generating means of the game device then may generate a certain event that accompanies a change of at least one of the parallax image corresponding to the stereoscopic image and a two-dimensional image on the display screen other than the parallax image in order to provide motivation to the player. Examples in this case of the certain event include a disappearance, shape change, size change, movement speed change of the parallax image corresponding to the stereoscopic image (i.e., a disappearance, shape change, size change, speed movement change of the stereoscopic image) when the operating body is sufficiently close to or touches the stereoscopic image, the appearance of a parallax image corresponding to a new stereoscopic image (i.e., the appearance of a stereoscopic image), or a change in the point display (an increase in the points obtained by the player) on the display screen. In this way, the game progresses while the player experiences feeling as if being able to perform a direct operation on the stereoscopic image that does not actually exist. That is, a new gaming appeal can be provided accompanying the sense of a three-dimensional operation.

The image display device according to a first embodiment of the present invention preferably further includes a first control means for controlling the image display means so as not to display the parallax image beforehand when, before the parallax image is displayed, the virtual stereoscopic image recognized based on the parallax image overlaps the operating body as seen by the viewer, and the operating body is determined to be positioned between the virtual stereoscopic image and the display screen.

When a positional relationship develops in which the operating body exists, as seen by the viewer, further behind the virtual spatial position of the stereoscopic image recognized by the viewer, the operating body seen by the viewer is displayed unnaturally due to the stereoscopic image. Specifically, only the distal end of the operating body overlapping the stereoscopic image appears to float in front of (on the viewer side) the stereoscopic image. Accordingly, the first control means controls the image display means so as not to display a parallax image beforehand that leads to the development of the above positional relationship in order to prevent such an unnatural sight. Consequently, the sense of the operation on the stereoscopic image by the operating body is able to appear more natural.

The image display device according to the first embodiment of the present invention may further include a second control means for controlling the image display means so as not to display the parallax image corresponding to the stereoscopic image when the operating body overlaps the stereoscopic image as seen by the viewer and the operating body has moved to a position between the stereoscopic image and the display screen.

When, as a result of the movement of the operating body, a positional relationship develops in which the operating body exists, as seen by the viewer, further behind the virtual spatial position of the stereoscopic image recognized by the viewer, the operating body seen by the viewer is displayed unnaturally due to the stereoscopic image. Specifically, only the distal end of the operating body overlapping the stereoscopic image appears to float in front of (on the viewer side) the stereoscopic image. Accordingly, the second control means controls the image display means so as not to display the parallax image corresponding to the stereoscopic image when the operating body has moved to a position such that the above positional relationship develops, in order to prevent such an unnatural sight. Specifically, the unnatural display is avoided by the disappearance of the stereoscopic image itself. Consequently, the sense of performing an operation on the stereoscopic image with the operating body becomes more natural.

The image display device according to the first embodiment of the present invention may further include a third control means for controlling the image display means to move the parallax image corresponding to the stereoscopic image to a position in which the stereoscopic image corresponding to the parallax image does not overlap the operating body as seen by the viewer when the operating body overlaps the stereoscopic image as seen by the viewer and the operating body has moved to a position between the stereoscopic image and the display screen.

When, as a result of the movement of the operating body, a positional relationship develops in which the operating body exists, as seen by the viewer, further behind the virtual spatial position of the stereoscopic image recognized by the viewer, the operating body seen by the viewer appears unnatural due to the stereoscopic image. Specifically, only the part of the operating body overlapping the stereoscopic image appears to float in front of (on the viewer side) the stereoscopic image.

Accordingly, the third control means controls the image display means to move the parallax image corresponding to the stereoscopic image to a position in which the above positional relationship does not develop in order to prevent such an unnatural sight when the operating body has moved to a position such that the above positional relationship develops. Specifically, the unnatural display is avoided by causing the position of the stereoscopic image to be moved away from the operating body. Consequently, the sense of the operation on the stereoscopic image with the operating body may become more natural.

The image display device according to the first embodiment of the present invention may further include a fourth control means for controlling the event generating means to prohibit the generation of a certain event when, in a state in which the operating body is not substantially moving, the distance between the spatial coordinates of at least one point of the stereoscopic image and the spatial coordinates of at least one point of the operating body is equal to or less than a certain threshold.

The state in which the operating body is not substantially moving is considered to be when there is a lack of an active intention by the viewer to move the operating body toward the stereoscopic image recognized by the viewer. Accordingly, in this case, the fourth control means causes the event generating means to prohibit the generation of the certain event when it is determined that the distance between the spatial coordinates of at least one point of the stereoscopic image and the spatial coordinates of at least one point of the operating body is equal to or less than a certain threshold, that is, the stereoscopic image and the operating body are determined to be sufficiently close to each other. As a result, regardless of the active intention of the player, the generation of the event when the operating body and the stereoscopic image accidentally approach each other can be inhibited and the effectiveness of the event generation can be improved.

For example, it may be assumed that the image display device is applied to a game device that controls the progress of a game in which the player performs an operation on a stereoscopic image virtually recognized by the player as an object. The game progresses, for example, by providing motivation to the player to use the operating body to seemingly touch or move the operating body sufficiently close to the stereoscopic image recognized by the player. The event generating means of the game device then may generate a certain event (e.g., the disappearance of the stereoscopic image, the appearance of the stereoscopic image, an increase in the number of points obtained by the player, and the like) that accompanies a change of at least one of the parallax image corresponding to the stereoscopic image and a two-dimensional image on the display screen other than the parallax image in order to provide motivation to the player. If the event is generated when the stereoscopic image and the operating body accidentally touch or become sufficiently close to each other even though the player is not moving the operating body, the enjoyment of the game may be reduced since the event is generated without the accompaniment of an appropriate operation by the player. Accordingly, the fourth control means prevents an unsuitable event generation represented by the generation of an event without the accompaniment of a suitable operation by the player.

The first coordinate calculating means of the above image display device may be configured to calculate virtual spatial coordinates of the stereoscopic image corresponding to the parallax image on the basis of an amount of deviation of a left eye image and a right eye image that make up the parallax image, a first distance between the viewer and the display screen, and a second distance previously set as a distance between the pupils of the viewer; and the second coordinate calculating means may be configured to calculate the spatial coordinates of the operating body on the basis of a color and/or shape of an image of the operating body obtained by one or a pair of imaging units.

In the image display device, a position of the viewer for the stereoscopic image to be recognized by the viewer based on the parallax image displayed on the display screen, that is, the distance from the display screen to the viewer, is set as a certain first distance. In other words, it is presumed that the viewer of the image display device sees the display screen at a position spaced apart from the display screen only by the certain first distance in order for the viewer to see the parallax image on the display screen of the image display device and appropriately recognize the stereoscopic image corresponding to the parallax image.

One or a pair of imaging means in the image display device for taking images including the operating body may be realized by an imaging device mounted in the image display device, or may be realized by an external imaging device electrically connected to the image display device. A color of the image of the operating body may be used for quickly identifying the image of the operating body within the images obtained by the one or pair of imaging means, and for limiting the calculation range of the spatial coordinates of the operating body to a partial region to reduce the processing load.

According to the image display device, the position of the viewer with respect to the display screen is presumed and therefore the virtual spatial position of the stereoscopic image recognized by the viewer between the viewer and the display screen is uniquely determined. A display method of the image display device is set so that the viewer is able to recognize the stereoscopic image without wearing specialized glasses by presuming the position of the viewer with respect to the display screen. A parallax image display method such as, for example, a parallax barrier method or a lenticular method may be considered as such a type of display method. According to the image display device, the viewer is able to comfortably perform a direct operation on a stereoscopic image that does not actually exist without wearing cumbersome specialized glasses.

In the image display device according to the first embodiment of the present invention, the distal end of the operating body may be configured in a color and/or shape that is different from a part other than the distal end, and the event generating means may be configured to generate the certain event when a distance between the spatial coordinates of at least one point of the stereoscopic image calculated by the first coordinate calculating means and the spatial coordinates of at least one point of the distal end of the operating body calculated by the second coordinate calculating means is equal to or less than a certain threshold.

In the image display device, it is presumed that the viewer performs an action to move the distal end of the operating body closer to the stereoscopic image recognized by the viewer. The distal end of the operating body is configured in a color and/or a shape that is different from a part other than the distal end. Although various colors and shapes of the operating body may be considered, only the distal end may have a pointed shape and a part other than the distal end may have a rod-like shape when the entire operating body takes the form of a long and narrow rod-like pen. Alternatively, only the distal end may take any form with an easily recognizable pattern such as a star shape. Further, only the distal end may be red and a part other than the distal end may be white. In this case, when the second coordinate calculating means calculates the spatial coordinates of at least one point of the distal end of the operating body, the position of the operating body can be identified quickly, or the region subject to the calculation of the spatial coordinates in the operating body can be limited so that the processing load for calculating the spatial coordinates can be reduced since the distal end of the operating body is configured to have a color and/or shape different from the part other than the distal end. The event generating means then generates the certain event when the distance between the spatial coordinates of at least one point of the stereoscopic image and the spatial coordinates of at least one point of the distal end of the operating body becomes equal to or less than a certain threshold. According to the image display device, a reduced processing load and faster processing for calculating the spatial coordinates can be achieved.

A game program of the present invention causes a computer that can implement a game in which a player performs an operation on an object of a stereoscopic image virtually recognized by the player to implement: an image display function for displaying a parallax image on a display screen; a first coordinate calculating function for calculating virtual spatial coordinates of a stereoscopic image to be recognized by the player viewing the parallax image; a second coordinate calculating function for calculating spatial coordinates of an operating body to be operated by the player; and an event generating function for generating a certain event accompanying a change of at least one of the parallax image and an image on the display screen other than the parallax image when a distance between the spatial coordinates of at least one point of the stereoscopic image calculated by the first coordinate calculating function and the spatial coordinates of at least one point of the operating body calculated by the second coordinate calculating function is equal to or less than a certain threshold.

The computer may be, for example, a home game machine, an arcade game machine, a mobile game machine, a mobile telephone, a mobile information terminal, a personal computer, a server computer, a home server, and the like. The game program may be stored in a computer-readable information storage medium such as a DVD-ROM or a CD-ROM and the like.

A game control method of the present invention is a game control method for a game device that controls progress of a game in which a player performs an operation on an object of a stereoscopic image virtually recognized by the player, the method including: an image display step for displaying a parallax image on a display screen; a first coordinate calculating step for calculating virtual spatial coordinates of a stereoscopic image to be recognized by a player viewing the parallax image; a second coordinate calculating step for calculating spatial coordinates of an operating body to be operated by the player; and an event generating step for generating a certain event accompanying a change of at least one of the parallax image and an image on the display screen other than the parallax image when a distance between the spatial coordinates of at least one point of the stereoscopic image calculated in the first coordinate calculating step and the spatial coordinates of at least one point of the operating body calculated in the second coordinate calculating step is equal to or less than a certain threshold.

Effect of Invention

The image display device, the game program, and the game control method of the present invention allow a viewer of the image display device to be able to obtain feeling as if directly performing an operation on a stereoscopic image that does not actually exist.

BRIEF DESCRIPTION OF DRAWINGS

DESCRIPTION OF EMBODIMENTS (1) First Embodiment (1-1) Game Device Configuration and Operation FIG. 1 illustrates a player of a game device 1 and an external appearance of the game device 1 according to a first embodiment of the game display device of the present invention. The game device 1 is a game device that controls the progress of a game in which a player performs an operation of a stereoscopic image virtually recognized as an object by the player as a viewer. FIG. 2 is a block diagram illustrating the configuration of the game device 1 of the present embodiment.

As illustrated in FIG. 1, a liquid crystal monitor 3a (display screen) of a display device 3 is provided on the front surface part of the game device 1 of the present embodiment. Imaging lenses of a left imaging unit 20L and a right imaging unit 20R that face an object in the direction of the player are arranged in a parallel and level manner below the liquid crystal monitor 3a. The left imaging unit 20L and the right imaging unit 20R are provided for below-mentioned stereoscopic analysis.

Figure 1:
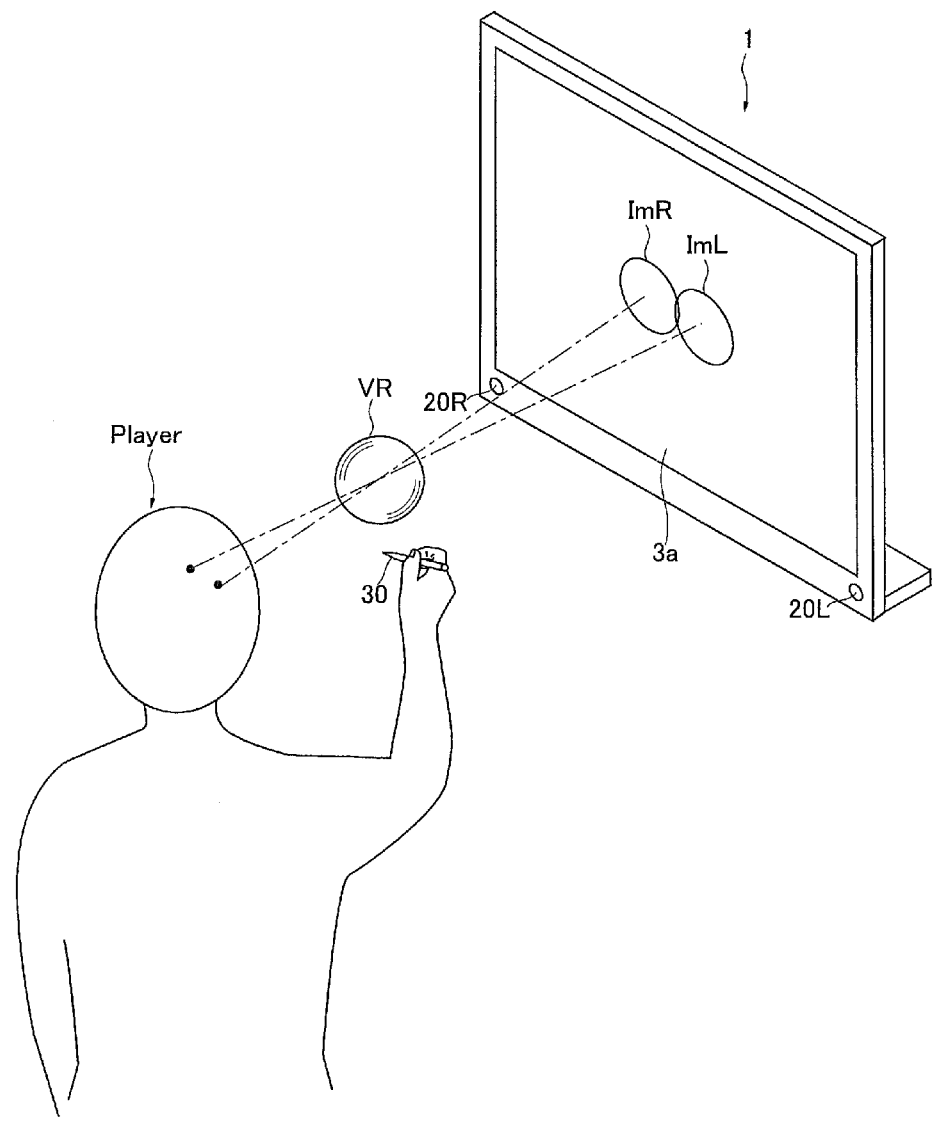
FIG. 1 illustrates a player and an external appearance of a game system according to a first embodiment.

Although the imaging units are housed in the game device 1 in the example illustrated in FIG. 1, separate imaging devices may be provided in a form in which the imaging devices are electrically connected to a control device 10 inside the game device 1. Data of images in frame units obtained by the imaging units are sequentially sent to a CPU 11 in the control device 10.

Although not illustrated in FIG. 1, one or a plurality of buttons for receiving operation inputs by the player may be provided in the game device 1. The buttons may include, for example, a power button for activating the game device and a selection button for causing any application programs set in the game device 1 to be activated. An input unit 4 illustrated in FIG. 2 may include one or a plurality of buttons provided in the game device 1 and an interface circuit for detecting a pressing input or an operation input of the buttons.

Figure 2:
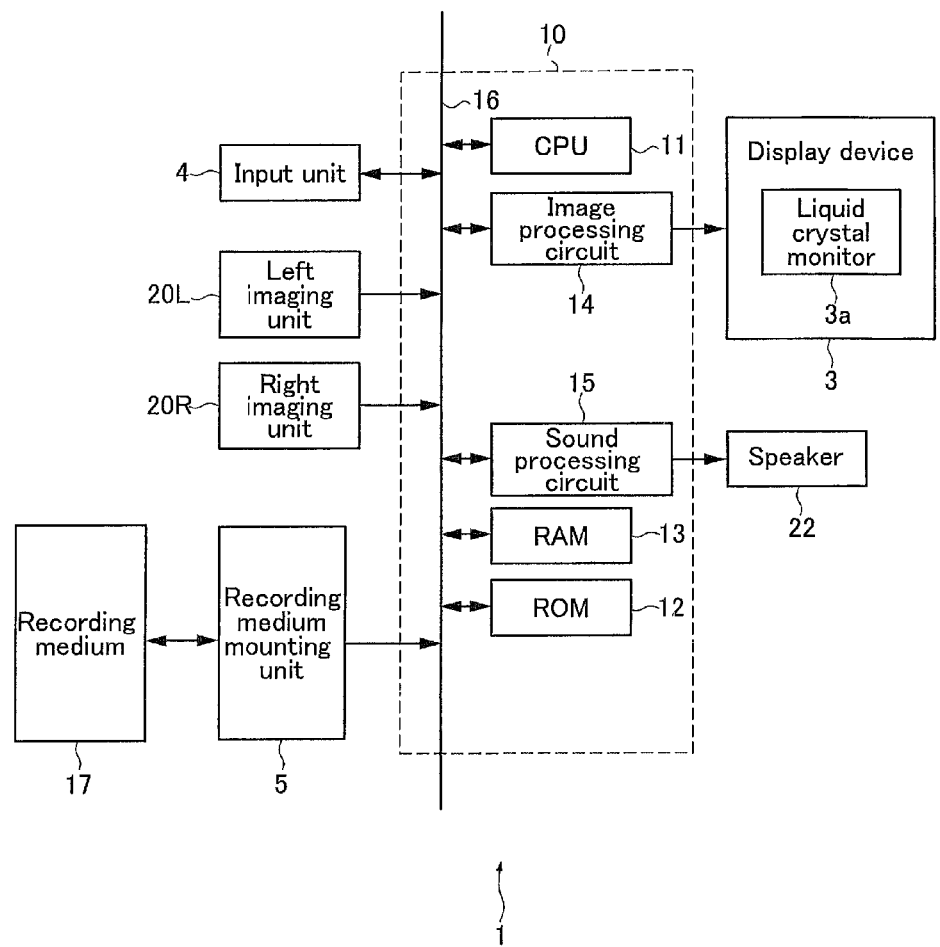
FIG. 2 is a block diagram of a game device configuration according to the first embodiment.

A storage medium mounting unit 5 (not illustrated in FIG. 1) in FIG. 2 may include, for example, a slot provided in the housing of the game device 1, the slot for accepting a storage medium 17, and an interface circuit for reading data from the storage medium 17 or writing data onto the storage medium 17. The storage medium 17 is, for example, a card-type storage medium that houses a flash memory, or a disk-like storage medium such as an optical disk and the like.

Referring to FIG. 2, the control device 10 of the game device 1 of the present embodiment is provided for executing a game program and for data processing and signal transfer processing accompanying the execution of the game program. The control device 10 mainly includes the central processing unit (CPU) 11, a read-only memory (ROM) 12, a random access memory (RAM) 13, an image processing circuit 14, and a sound processing circuit 15. The components of the control device 10 are connected to allow the transfer of signals through a bus 16 between the input unit 4, the left imaging unit 20L, the right imaging unit 20R, and the storage medium mounting unit 5.

The CPU 11 interprets game program commands and performs various types of data processing in response to the commands.

The image processing circuit 14 mainly performs generation treatment processing of image data. For example, the image processing circuit 14 conducts various types of saturation operations and transmission operations such as a-blending and superposition operations of two-dimensional images. The image processing circuit 14 in the present embodiment in particular generates and displays a parallax image for allowing the player to recognize a virtual stereoscopic image. Moreover, the image processing circuit 14 includes a function for buffering (i.e., function as a VRAM) the image data to be rendered in each frame.

The storage medium 17 is provided for storing, for example, game programs and various data used in the game programs. The various data read from the storage medium 17 are temporarily stored in the RAM 13. Moreover, data required for the progression of a game is stored in the RAM 13 and the data may be sequentially updated, erased, or added by the CPU 11.

The display device 3 is mainly provided for outputting data of images (including parallax images) generated by the image processing circuit 14 and data and the like of images (including parallax images) read from the storage medium as images on the liquid crystal monitor 3a. In the following explanation, the simple use of the term "image" includes both a parallax image for allowing the player to recognize a stereoscopic image, and a two-dimensional image seen directly by the player on the liquid crystal monitor 3a. The liquid crystal monitor 3a of the display device 3 is, for example, a liquid crystal display monitor. Images are displayed on the basis of the image data by horizontally driving and vertically driving thin-film transistors provided in pixel units in a matrix arrangement.

In the game device 1 of the present embodiment, parallax images are preferably displayed by a system that allows a stereoscopic image to be recognized without the player wearing specialized glasses for the stereoscopic image. A parallax image display method such as, for example, a parallax barrier method or a lenticular method may be considered as such type of display method.

The parallax barrier method is a method in which very narrow slits are provided on the display screen (liquid crystal panel), and the lenticular method is a method in which a lenticular lens made up of multiple minute hemicylindrical lenses is provided on the display screen. Different positions of an image can be seen in these methods in accordance with the viewing angles (line of sight angles) of the left and right eyes of the viewer (herein, player) due to the slits or the hemicylindrical lenses. That is, separate images (image having stereoparallax) can be seen by the right eye and the left eye by perpendicularly dividing an image that is seen from viewpoints corresponding to the positions of the right and left eyes and arranging the divided images in suitable positions, so that a stereoscopic image can be achieved.

For example, with reference to FIG. 1, a left eye image ImL and a right eye image ImR that make up a parallax image are displayed on the liquid crystal monitor 3a of the game device 1 of the present embodiment. Only the left eye image ImL of the parallax image can be seen by the left eye of the player, and only the right eye image ImR of the parallax image can be seen by the right eye of the player. As a result, the presence of a virtual stereoscopic image VR between the player and the display screen can be recognized by the eyes of the viewer.

The sound processing circuit 15 is provided mainly for outputting sound data read from the storage medium 17 and/or sound data generated by the sound processing circuit 15 itself, from a speaker 22 as sound. The sound processing circuit 15 may include, for example, a decoding circuit for decoding compressed sound data, and an amplifying circuit for amplifying the decoded sound signals.

With reference to FIG. 1, an operating body 30 is illustrated that is to be operated by the player. The operating body 30 is used by the player to perform an operation on the stereoscopic image VR. The operating body 30 is an imaging target of the left imaging unit 20L and the right imaging unit 20R provided at the front surface part of the game device 1 of the present embodiment. Although the material, shape, and color of the operating body 30 may take any form, the distal end of the operating body 30 is preferably configured to have a different color and/or shape from a part of the operating body 30 other than the distal end in order to limit the analysis range and reduce the processing load during a below-mentioned stereoscopic analysis by the left imaging unit 20L and the right imaging unit 20R. For example, as illustrated in FIG. 1, only the distal end may have a pointed shape and a part other than the distal end may have a rod-like shape when the entire operating body 30 takes the form of a long and narrow rod-like pen. Alternatively, only the distal end may take any form with an easily recognizable pattern such as a star shape. Further, only the distal end may be red and a part other than the distal end may be white.

(1-2) Example of Game Executed in Game Device

Figure 3A:
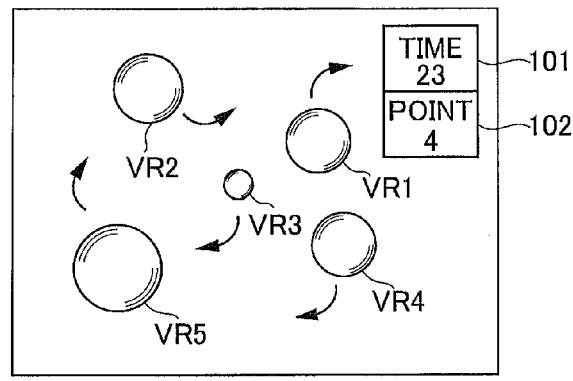
FIGS. 3A, 3B and 3C represent examples of a game executed on the game device of the first embodiment.
Figure 3B:
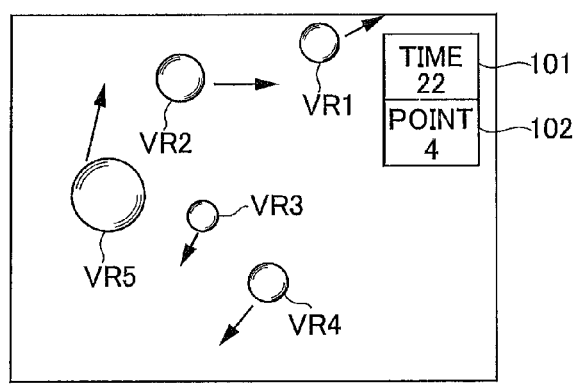
Figure 3C:
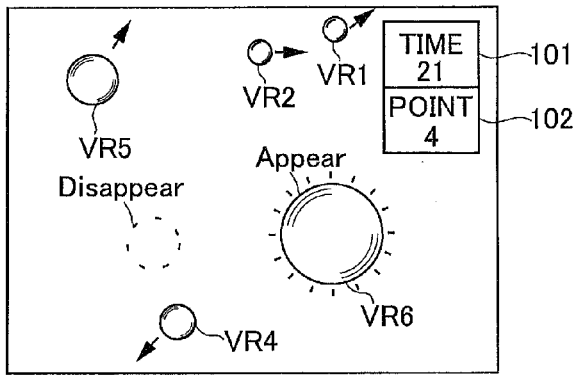
Figure 4A:
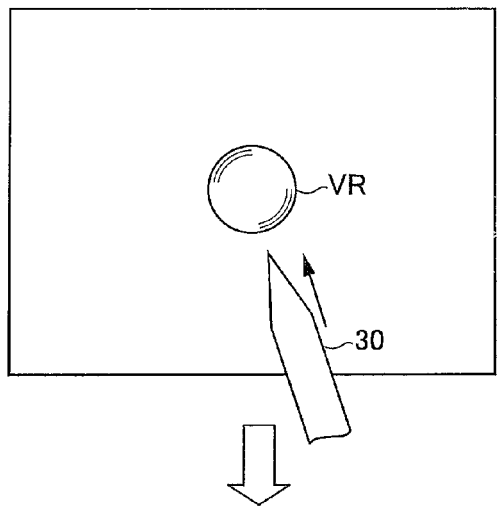
FIGS. 4A, 4B and 4C represent examples of a game executed on the game device of the first embodiment.
Figure 4B:
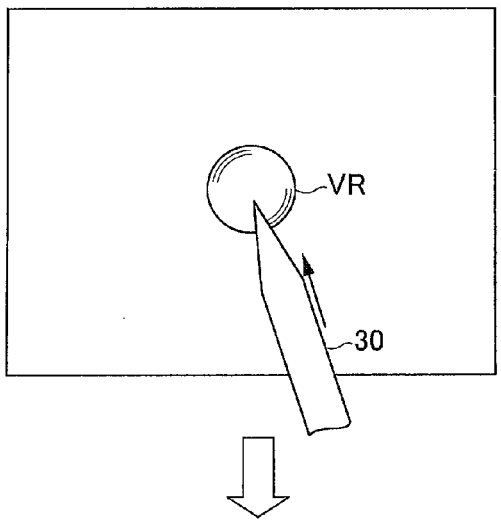
Figure 4C:
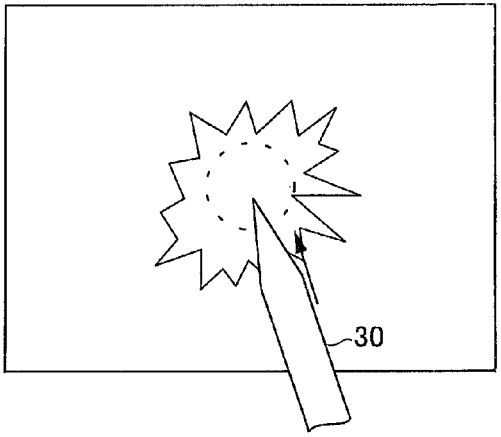

The following describes, with reference to FIGS. 3 and 4, an example of a game in which a player performs an operation on a stereoscopic image virtually recognized by the player as an object, the game being executed in the game device 1 of the present embodiment. Each of FIGS. 3A, 3B and 3C is an illustrative example of stereoscopic images recognized by a player viewing the liquid crystal monitor 3a during a passage of time and in the order of FIGS. 3A, 3B, and 3C. FIGS. 4A, 4B and 4C represent examples of operations in the game by a player and events generated by the operations during the passage of time and in the order of FIGS. 4A, 4B, and 4C.

With reference to FIGS. 3A, 3B and 3C, a plurality of parallax images are displayed in the game on the liquid crystal monitor 3a, and the presence of a plurality of stereoscopic images VR1 to VR5 is recognized by the player between the liquid crystal monitor 3a and the player in correspondence with the parallax images. Herein, an example is used in which the stereoscopic images recognized by the player are spherical objects. The parallax images are displayed as moving accompanying the passage of time, and as a result, the player sees the spherical stereoscopic images as if they are moving in space. The spherical stereoscopic images appear and start to move at an arbitrary timing and after they appear become larger and smaller over the passage of time, and then disappear after a certain amount of time has passed since their appearance. For example, at the point in time in FIG. 3A, the stereoscopic images VR1 to VR5 move in the directions of the arrows. Although all the stereoscopic images VR1 to VR5 are present at the point in time in FIG. 3B, the positions have changed and the sizes have become smaller in comparison the point in time in FIG. 3A. When the passage of time reaches the point in time in FIG. 3C, the stereoscopic image VR3 disappears and a new stereoscopic image VR6 appears.

Display areas 101, 102 are for displaying a play time (TIME) provided to the player and points (POINT) obtained by the player on the liquid crystal monitor 3a illustrated in FIGS. 3A, 3B and 3C.

In this game, a certain event is generated when the operating body 30 is determined to touch or be sufficiently close to a virtual stereoscopic image recognized by the player. Examples of the certain event include, for example, the disappearance of the parallax image corresponding to the stereoscopic image (i.e., the disappearance of the stereoscopic image) when the operating body 30 is determined to touch or be sufficiently close to the stereoscopic image, the appearance of a parallax image corresponding to a new stereoscopic image (i.e., the appearance of a stereoscopic image), or a change in the point display (an increase in the points obtained by the player) on the display screen. For example, the game may be a game played between a plurality of players wherein, during a certain play time provided to the players (e.g., until the TIME displayed in FIGS. 3A, 3B and 3C reaches zero), as many of the stereoscopic images as possible are made to disappear due to the operating body 30 touching or being sufficiently close to as many of the stereoscopic images as possible.

FIGS. 4A, 4B and 4C illustrate an operation of the operating body 30 of the player on a stereoscopic image VR along a time sequence. At the point in time in FIG. 4A, a distance between the operating body 30 and the stereoscopic image VR is larger than a threshold and thus the event is not generated despite the player moving the operating body 30 toward the stereoscopic image VR recognized by the player. At the point in time in FIG. 4B, the distance between the operating body 30 and the stereoscopic image VR is still larger than the threshold and thus the event is not generated despite the player moving the operating body 30 further toward the stereoscopic image VR recognized by the player. At the point in time in FIG. 4C, the distance between the operating body 30 and the stereoscopic image VR is equal to or less than the threshold, and thus it is determined that the operating body 30 has touched or is sufficiently close to the stereoscopic image. Consequently, an example is displayed of the generation of the event accompanying a change in the parallax image displayed on the liquid crystal monitor 3a such that the stereoscopic image VR appears to explode and disappear. As a further generated event, a change in the points (e.g., an increase in the value of POINT displayed in FIGS. 3A, 3B and 3C) displayed in the display area 102 in FIGS. 3A, 3B and 3C may be performed.

(1-3) Overview of Functions of Game Device

Figure 5:
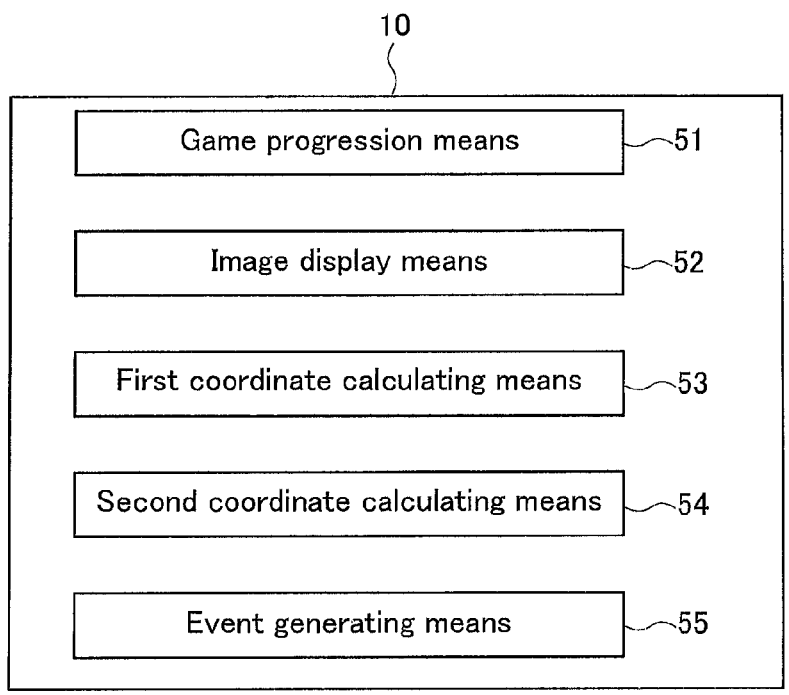
FIG. 5 is a functional block diagram for explaining functions fulfilling main roles in the game device according to the first embodiment.

The following describes functions realized by the game device 1 while referring to the execution by the game device 1 of the game described with reference to FIGS. 3A to 3C and 4A to 4C. FIG. 5 is a functional block diagram for explaining functions fulfilling main roles in a control device 10 of the game device 1 according to present embodiment.

A game progression means 51 includes a function to arrange a game environment, which includes data settings and the like required for the progression of the game, in response to a game program execution instruction input (or a game program selection input) by the player. In the game progression means 51, various data including objects and characters are transferred from the recording medium 17 to the RAM 13 when a game program is loaded from the recording medium 17 into the RAM 13 and executed by the CPU 11.

The game progression means 51 may arrange the objects inside a game space on the basis of the data of the objects in the RAM 13.

The game progression means 51 includes functions such as managing a play time provided to the player, managing the player's points, and managing the display in response to the play conditions or an input made by a player on the input unit 4, in accordance with the game progression.

An image display means 52 includes a function of displaying a parallax image on the liquid crystal monitor 3a that is the display screen of the game device 1. The image display means 52 is realized as described below. Specifically, the image processing circuit 14 displays a parallax image at a position on the liquid crystal monitor 3a instructed by the CPU 11 and at a timing instructed by the CPU 11. In the exemplary game illustrated in FIGS. 3A, 3B and 3C, the CPU 11 sends to the image processing circuit 14 instructions for a parallax image appearance timing, a parallax image trajectory after the appearance, a parallax image shape change after the appearance, a parallax image disappearance timing, amounts of deviation in the parallax image between the left eye image and the right eye image (i.e., settings for a position in the depth direction of the stereoscopic image that the player recognizes), and the like for each of the plurality of parallax images. The image processing circuit 14 sequentially generates image data in frame units including the parallax images on the basis of the instructions from the CPU 11, and outputs the image data to the display device 3. The display device 3 displays images on the liquid crystal monitor 3a on the basis of the image data received from the image processing circuit 14.

A first coordinate calculating means 53 includes a function of calculating virtual spatial coordinates of a stereoscopic image recognized by the player who is a viewer of the parallax image. Specifically, the presence of the virtual stereoscopic image between the player and the display screen is recognized by the player due to the player who is looking at the parallax image seeing the left eye image and the right eye image included in that parallax image. The first coordinate calculating means 53 calculates the virtual spatial coordinates of the stereoscopic image. A detailed example of the calculation method for calculating the virtual spatial coordinates of the stereoscopic image will be described hereinbelow with reference to FIG. 6.

Figure 6:
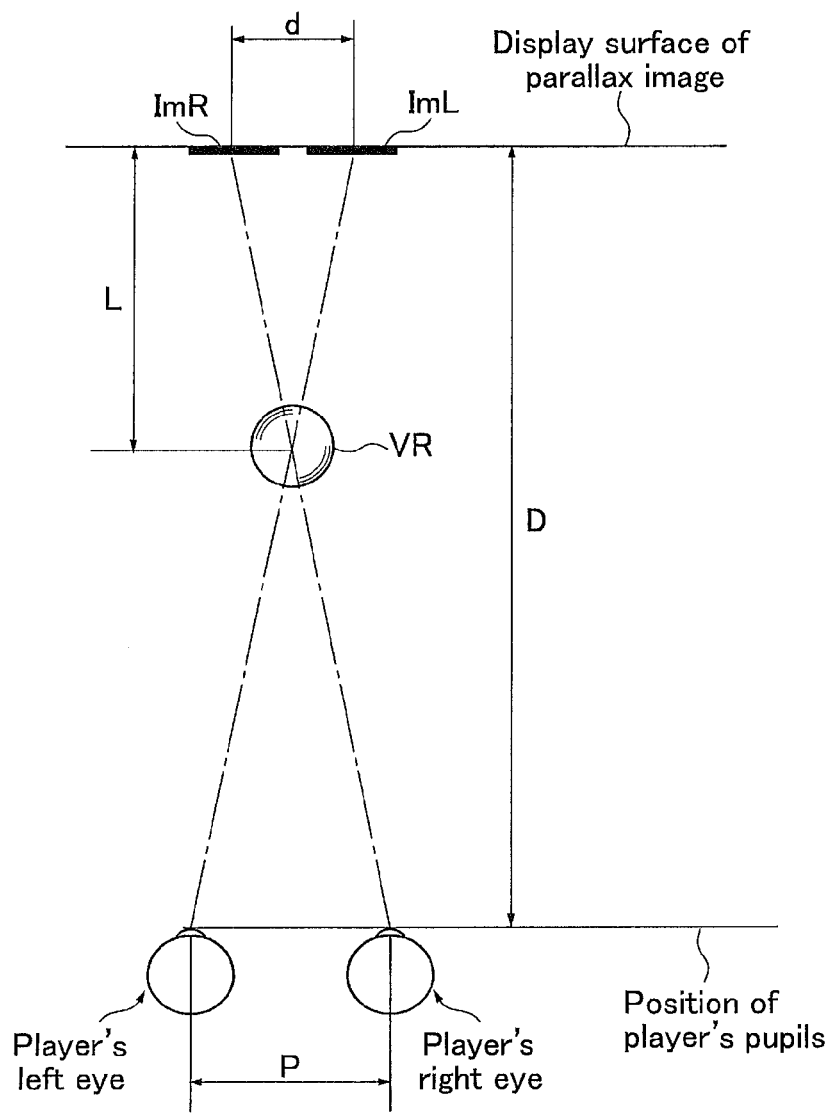
FIG. 6 is a diagram for explaining a calculation method of virtual spatial coordinates of a stereoscopic image recognized by a player in the game device of the first embodiment.

FIG. 6 is a diagram for explaining a calculation method of the virtual spatial coordinates of the stereoscopic image recognized by the player. The symbols d, D, P, and L in FIG. 6 are defined as follows.

d: Amount of deviation between the left eye image ImL and the right eye image ImR of the parallax image.

D: Distance (first distance) between the player and the liquid crystal monitor 3a (display surface of the parallax image).

P: Distance (second distance) between the pupils of the player

L: Distance from the liquid crystal monitor 3a to the stereoscopic image VR.

The CPU 11 calculates the distance L according to the following equation (E1) in order to establish L/d=(D−L)/P.

$$L=d/(P+d)\times D \tag{E1}$$

It may be assumed herein that the distance D from the liquid crystal monitor 3a to the player is substantially a fixed value for the player to suitably recognize the virtual stereoscopic image based on the parallax image on the liquid crystal monitor 3a when the abovementioned parallax barrier method or the lenticular method is used for the display method of the parallax image. In other words, when the above methods are used, the player of the game device 1 is presumed to be looking at the liquid crystal monitor 3a at a position that is the above certain distance D away from the liquid crystal monitor 3a. In such a case, the distance D in the above equation (E1) may be set as a fixed value.

Further, the distance P between the pupils of the player may be previously set as a fixed value in the calculation of the above equation (E1) since the value does not fluctuate greatly for each player.

The amount of deviation d between the left eye image ImL and the right eye image ImR of the parallax image is sequentially set by the CPU 11 and thus the set value is used as-is in the above equation (E1) since the value is a setting of the position in the depth direction of the stereoscopic image recognized by the player.

Although the spatial position in the vertical direction of the virtual stereoscopic image VR recognized by the player also changes in response to the vertical position of the player's viewpoint, the viewpoint position of the player with respect to the position of the liquid crystal monitor 3a provided in the game device 1 may be considered as a substantially fixed value. Accordingly, the spatial positions of both pupils of the player may be a certain predetermined value in the calculation of the above equation (E1).

The first coordinate calculating means 53 is realized as described below. Specifically, the CPU 11 uses the above equation (E1) to sequentially (in frame units) calculate virtual spatial coordinates of the stereoscopic image VR recognized by the player on the basis of a certain position of the display surface (display surface of the liquid crystal monitor 3a) of the parallax image. For example, when a certain position on the display surface of the parallax image is established as an origin, and if the display surface is defined as an X-Y plane and the axis from the origin toward the player is defined as the +Z axis, the CPU 11 derives the X and Y coordinates of center positions (in this example, the center positions of substantially spherical objects) of the left eye image ImL and the right eye image ImR of the parallax image that changes moment by moment, and sequentially calculates the Z coordinate of the center position of the stereoscopic image VR as a calculation result of above equation (E1). As a result, the CPU 11 is able to calculate the X, Y, and Z coordinates of the stereoscopic image VR based on the origin from the geometric conditions illustrated in FIG. 6. Moreover, since the stereoscopic image VR is a projection of the left eye image ImL and the right eye image ImR of the parallax image, the stereoscopic image VR may be considered to have a spherical radius that is the same as those of the left eye image ImL and the right eye image ImR. As described above, when a certain position of the display surface is established as the origin, any point of a virtual spatial coordinate on the surface of the spherical stereoscopic image VR recognized by the player can be calculated.

A second coordinate calculating means 54 includes a function for calculating spatial coordinates of the operating body 30 that is the operation object of the player. The second coordinate calculating means 54 is realized as described below. The CPU 11 calculates the spatial coordinates of the operating body 30 using a known stereoscopic analysis on the basis of left images and right images sequentially (in frame units) obtained from the respective left imaging unit 20L and right imaging unit 20R. The calculation method for calculating the spatial coordinates of the operating body 30 will be described hereinbelow with reference to FIG. 7.

Figure 7:
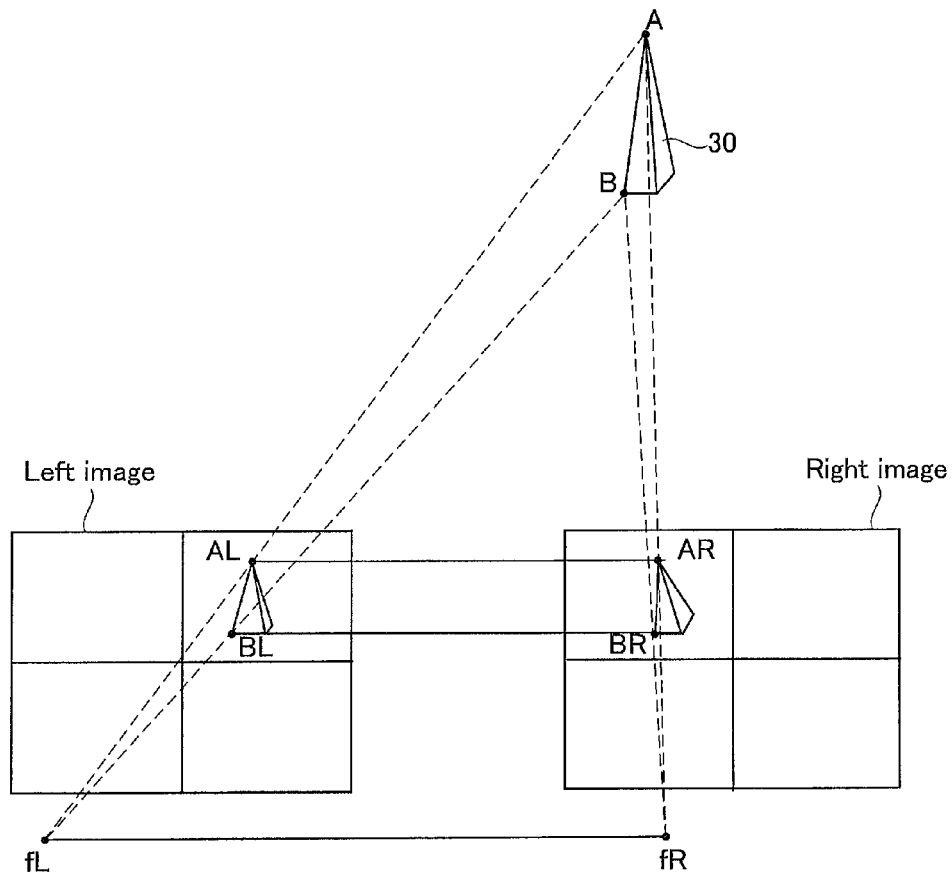
FIG. 7 is a diagram for explaining a calculation method of spatial coordinates of an operating body in the game device of the first embodiment.

FIG. 7 describes a method for calculating the spatial coordinates of the operating body 30, with the operating body 30 or a portion (e.g., a distal end) of the operating body 30 being exemplified as a quadrangular pyramid.

A method of obtaining three-dimensional information through stereoscopic analysis involves obtaining images of an object from different viewpoints and obtaining three-dimensional information of the object from the differences between the positional relationships of the viewpoints and how the images look. In FIG. 7, fL indicates the focal position of the left imaging unit 20L, and fR indicates the focal position of the right imaging unit 20R.

In the game device 1 of the present embodiment, two images (left image, right image) are obtained from the left imaging unit 20L and the right imaging unit 20R having imaging lenses arranged in a parallel and level manner, and one of the images, e.g., the left image, is established as the reference image. In the example illustrated in FIG. 7, spatial coordinates of points A, B are calculated on the basis of the principle of triangulation from the difference (parallax) between positions AL, BL (points in which the points A, B are projected by the left imaging unit 20L) on the coordinates of the reference image (left image) and positions AR, BR (points in which the points A, B are projected by the right imaging unit 20R) on the coordinates of the right image corresponding to the points A, B on the operating body 30 to be analyzed, and from the left and right focal positions fL, fR. For example, when calculating the spatial coordinates of the point A of the operating body 30, the CPU 11 calculates the spatial coordinates of the point A based on either of the focal positions fL, fR, for example, on the basis of the position AL corresponding to the left image A point, the position AR corresponding to the right image A point, and the known focal positions fL, fR.

Normally when obtaining three-dimensional information through stereoscopy, confirmation is made as to whether the point on the image that is established as the one reference point corresponds to a point on another image through corresponding point searching (matching operation). The corresponding point with respect to the point on one image exists on a straight line inside the other image. Generally, this straight line is called an epipolar line. In the game device 1 of the present embodiment, the epipolar lines are horizontal and a match is made in a one-dimensional search in the horizontal direction since the imaging lenses of the left imaging unit 20L and the right imaging unit 20R are arranged in a parallel and level manner.

The second coordinate calculating means 54 is realized as described below. Specifically, the CPU 11 sequentially (in frame units) calculates the spatial coordinates of the points that make up the operating body 30 using the abovementioned stereoscopic analysis. The origin for the spatial coordinates of the operating body 30 calculated at this time is preferably made to be congruent with the origin for the spatial coordinates of the stereoscopic image calculated by the first coordinate calculating means 53. Since the positional relationship of the focal positions of the left imaging unit 20L and the right imaging unit 20R and the certain position on the display surface established as the origin by the first coordinate calculating means 53 are fixed, it goes without saying that this type of coordinate conversion processing may be conducted easily.

The image corresponding to the operating body 30 is preferably quickly identified from the right and the left images in the abovementioned stereoscopic analysis. Moreover, the processing load of the corresponding point search in the abovementioned stereoscopic analysis has an increasingly large calculation load in correspondence with an increase in the number of search objects. Accordingly, the color of the image of the operating body 30 may be used in order to quickly identify the image of the operating body from the left and right images and thus limit the calculation range of the spatial coordinates in the operating body 30 and reduce the processing load of the corresponding point search. For example, when only the distal end of the operating body 30 is red and a portion other than the distal end is white, the image of the operating body 30 in the images can be quickly identified on the basis of brightness information in the left and right images, and the calculation range of the spatial coordinates of the operating body 30 can be limited so that faster processing can be achieved.

An event generating means 55 includes a function to generate a certain event that accompanies a change of at least one of the parallax image or an image on the liquid crystal monitor 3a other than the parallax image when the distance between the spatial coordinates of at least one point of the stereoscopic image calculated by the first coordinate calculating means 53 and the spatial coordinates of at least one point of the operating body 30 calculated by the second coordinate calculating means 54 is equal to or less than a certain threshold. The certain threshold in this case may be appropriately set for the provision of the type of game executed by the game device 1 of the present embodiment or for a suitable game related to the presence or absence of the generation of the event.

The event generating means 55 generates the certain event when it is determined that the operating body 30 that is the operation object of the player and the stereoscopic image recognized by the player are sufficiently close to each other. The event generating means 55 is realized as described below. Specifically, the CPU 11 sequentially (in frame units) compares the calculation results of the virtual spatial coordinates of the points (e.g., a plurality of representative points of the surface if the stereoscopic image is the spherical stereoscopic image illustrated in FIGS. 3A, 3B and 3C) of the stereoscopic image recognized by the player with the calculation results of the spatial coordinates of the points of the operating body 30 on the basis of the certain origin, and calculates a distance between both results. The CPU 11 then compares the calculated distance with the certain threshold and performs the control of the display to generate the certain event when it is determined that the calculated distance is equal to or less than the certain threshold.

The certain event is one that accompanies a change in at least one of the parallax image on the liquid crystal monitor 3a and an image on the liquid crystal monitor 3a other than the parallax image, that is, one that accompanies a change in the stereoscopic image recognized by the player and/or a change of a two-dimensional image on the liquid crystal monitor 3a. The certain event then is the change that can be seen by the player. For example, in the example illustrated in FIGS. 4A, 4B and 4C, the CPU 11 is able to control the image processing circuit 14 so that the parallax image displayed on the liquid crystal monitor 3a is changed in such a way that the stereoscopic image VR seems to explode and disappear as the certain event. Moreover, the CPU 11 is able to control the image processing circuit 14 so that the change of the points, i.e., an increase in the number of points, in the display area illustrated in FIGS. 3A, 3B and 3C is performed as the certain event. The certain event is freely set in accordance with the contents of the game to be executed. For example, the certain event may include a change in the shape, size, movement speed, or the disappearance of the parallax image (i.e., the disappearance or a change in the shape, size, or movement speed of the stereoscopic image) corresponding to the stereoscopic image that the operating body 30 touches or moves sufficiently close to. The certain event may also accompany the appearance of a new parallax image corresponding to the stereoscopic image (i.e., appearance of the stereoscopic image). The change in the movement speed herein includes, for example, an increase, a decrease, or a stop in the speed of a moving stereoscopic image, or conversely, the start of movement of a stopped stereoscopic image.

In the game device 1 of the present embodiment, since the certain event is performed by the event generating means 55 when it is determined that the operating body 30 that is the operational body of the player and the stereoscopic image recognized by the player are sufficiently close to each other, the player of the game device 1 anticipates the generation of the certain event accompanying the change on the display, or aims to generate the certain event by actively moving the operating body 30 that is the operation object toward the stereoscopic image recognized by the player. In this case, the game is desirably set so that the player requires a level of skill to move the operating body 30 close to the stereoscopic image while the stereoscopic image recognized by the player is moving as illustrated in FIGS. 3A, 3B and 3C. As a result, the game progresses while the player experiences feeling as if being able to directly perform an operation on the stereoscopic image that does not actually exist. That is, a new gaming enjoyment can be provided accompanying the sense of a three-dimensional operation.

(1-4) Main Processing Flow of Game

Figure 8:
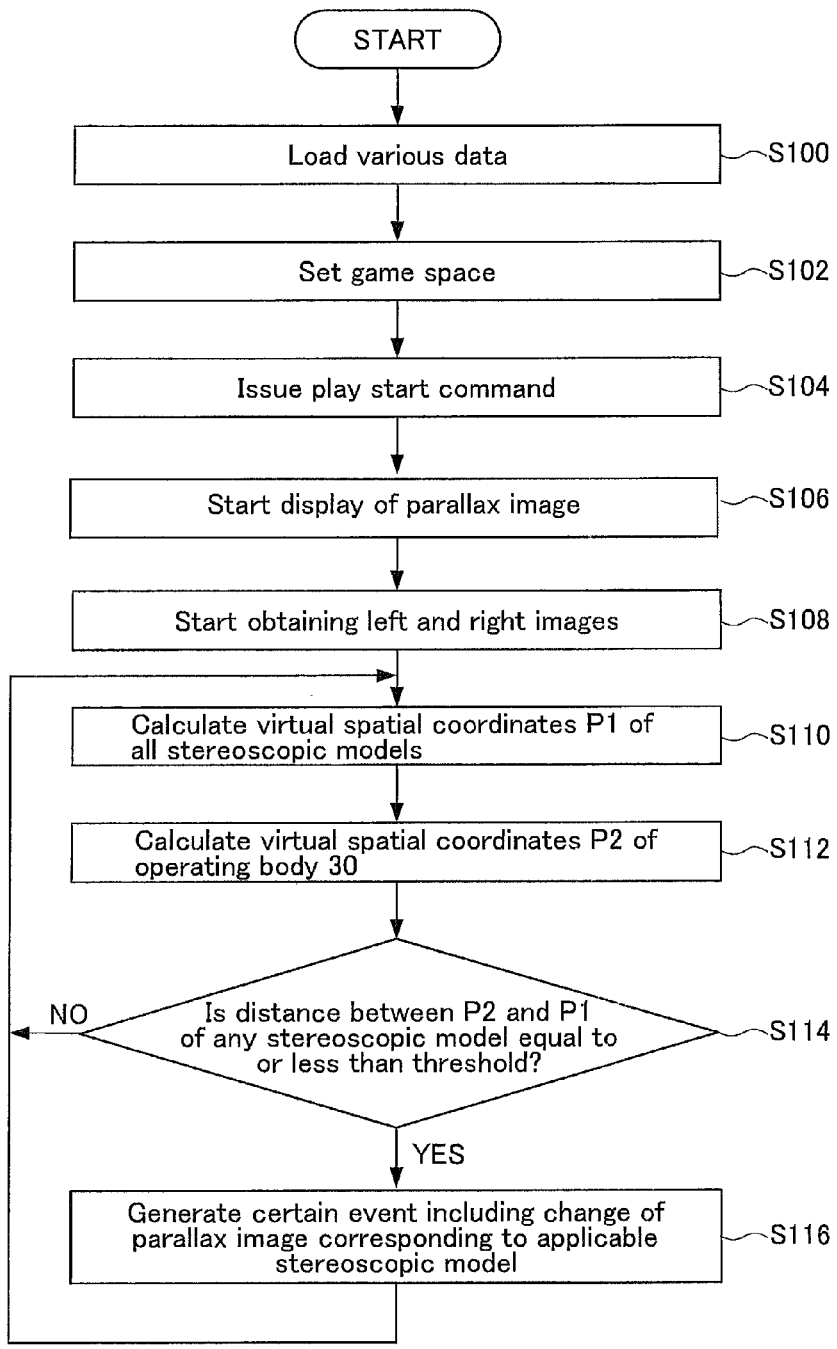
FIG. 8 is a main processing flow of a game exemplified in the first embodiment.

The following is a description with reference to the flowchart of FIG. 8 of an example of a main processing flow of the game device 1 of the present embodiment when executing the game exemplified in FIGS. 3 and 4.

First, in addition to a game program, various data such as objects are loaded from the recording medium 17 into the RAM 13 and stored in the RAM 13 (step S100). The game progression means 51 is executed first when the CPU 11 interprets the loaded game program. The game progression means 51 refers to the data of the objects in the RAM 13 to set a game space in which the objects are arranged in certain positions (step S102).

When a play start command is issued (step S104), the game progression means 51 subsequently manages the play time provided to the player, manages the player's points, and manages the display in response to the play conditions or an input made by the player on the input unit 4, in accordance with the game progression. Moreover, the image display means 52 starts the display of the parallax image accompanying the issue of the play start command (step S106). More specifically, the image display means 52 displays a plurality of parallax images corresponding to a plurality of spherical stereoscopic images on the liquid crystal monitor 3a so that the spherical stereoscopic images appear and start to move at arbitrary timings and after they appear grow smaller over the passage of time, and then disappear after a certain amount of time has passed since their appearance.

Further, the left imaging unit 20L and the right imaging unit 20R start obtaining images (left images and right images) in front of the liquid crystal monitor 3a accompanying the issue of the play start command (step S108), and the image display means 52 sequentially sends the images to the CPU 11 in frame units.

When the display of the parallax images is started in step S106, the first coordinate calculating means 53 calculates virtual spatial coordinates (herein rendered as "P1") of the plurality of points (e.g., previously set representative points) on the surface of each of the plurality of spherical stereoscopic images recognized by the player (step S110). Herein, the first coordinate calculating means 53 sequentially calculates center positions of the spherical stereoscopic images on the basis of the above equation (E1) according to the positions of the parallax images that change in frame units and the amounts of deviation of the left eye images and the right eye images that make up the parallax images, so that the virtual spatial coordinates P1 on the surface of spheres with certain radii (the same radii as the circular parallax image radii) are calculated with respect to the center positions.

Next, the second coordinate calculating means 54 calculates the spatial coordinates (herein rendered as "P2") of the points of the operating body 30 by performing stereoscopic analysis on the basis of the left and right images sequentially obtained in frame units by the left imaging unit 20L and the right imaging unit 20R in step S108 (step S112). As described above, the spatial coordinates of the points of the operating body 30 are calculated herein on the basis of the principle of triangulation from the points of the operating body 30 projected by the left and right images, and on the left and right focal positions fL, fR. Processing to make the origin of the spatial coordinates calculated in step S110 and the origin of the spatial coordinates calculated in step S112 congruent with each other is preferably performed at this time due to the subsequent determination in step S114.

This game, for example, is a competitive game in which the operating body 30 is made to touch or be sufficiently close to as many stereoscopic images as possible during the certain play time provided to the player, and it is assumed that the player is provided with motivation to make the operating body 30 touch or be sufficiently close to the stereoscopic images combined with the timing of the moving stereoscopic images. The event generating means 55 then calculates the distance between the virtual spatial coordinates P1 of the points of the spherical stereoscopic images calculated in step S110 and the spatial coordinates P2 of the points of the operating body 30 calculated in step S112, and compares the calculated distance with a certain threshold (step S114). As a result, when it is determined that the calculated distance is equal to or less than the certain threshold, that is, when it is determined that the player has moved the operating body 30 sufficiently close to any of the stereoscopic images (specifically, the stereoscopic images recognized based on the parallax images in the display of the liquid crystal monitor 3a) recognized by the player, the event generating means 55 generates the certain event that includes the change of the parallax image corresponding to the applicable stereoscopic image (step S116). As an example of the change of the parallax image included in the certain event, the parallax image may be made to change so that the stereoscopic image VR appears to explode and disappear as exemplified in FIGS. 4A, 4B and 4C. Moreover, a change of the points, that is, an increase in the number of points obtained by the player, in the display area 102 illustrated in FIGS. 3A, 3B and 3C may be performed as a generated event. As described above, the player in this game strives to cause a number of stereoscopic images to disappear by making the operating body 30 touch or be sufficiently close to a stereoscopic image so that the stereoscopic image disappears within the certain play time. As a result, the game progresses while the player experiences feeling as if being able to directly perform an operation on the stereoscopic image that does not actually exist. That is, a new gaming enjoyment can be achieved accompanying the sense of a three-dimensional operation.

(2) Second Embodiment

Hereinbelow, a second embodiment of the present invention will be described. In the following embodiments, the actions and configuration of the game device, the methods executed by the game device, and the main processing flows of the game are the same as those of the first embodiment unless otherwise noted.

Figure 9:
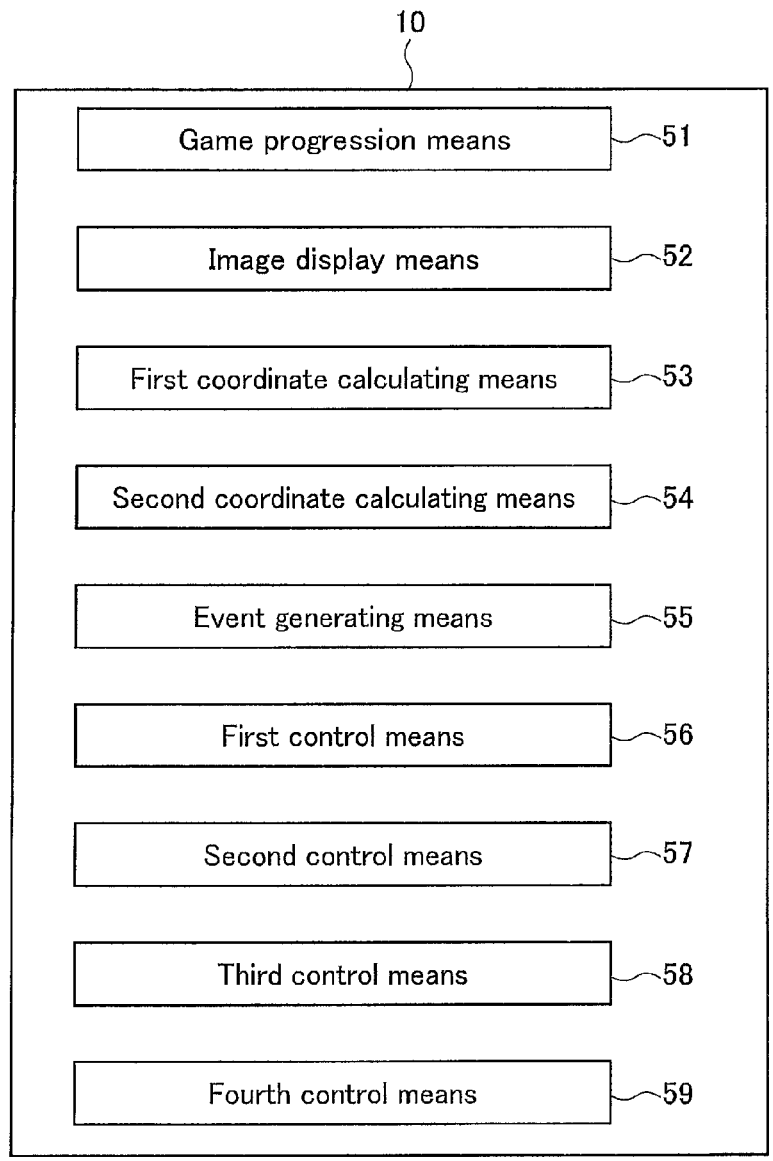
FIG. 9 is a block diagram of a game device configuration according to a second embodiment.

FIG. 9 is a functional block diagram for explaining functions fulfilling main roles of a control device 10 according to the present embodiment. The functional block diagram illustrated in FIG. 9 differs from that of FIG. 2 in that a first control means 56, a second control means 57, a third control means 58, and a fourth control means 59 have been included. The control device 10 of the present embodiment illustrated in FIG. 9 is described as including all of the first control means 56, the second control means 57, the third control means 58, and the fourth control means 59 for the sake of convenience, but the present embodiment is not limited as such. At least any of the first control means 56, the second control means 57, the third control means 58, or the fourth control means 59 may be included.

The first control means 56 includes the function of controlling the image display means 52 so as not to display a parallax image beforehand when it is determined that, before the parallax image is displayed, a virtual stereoscopic image recognized based on the parallax image overlaps the operating body 30 as seen by the player and the operating body 30 is positioned between the virtual stereoscopic image and the liquid crystal monitor 3a.

Figure 10A:
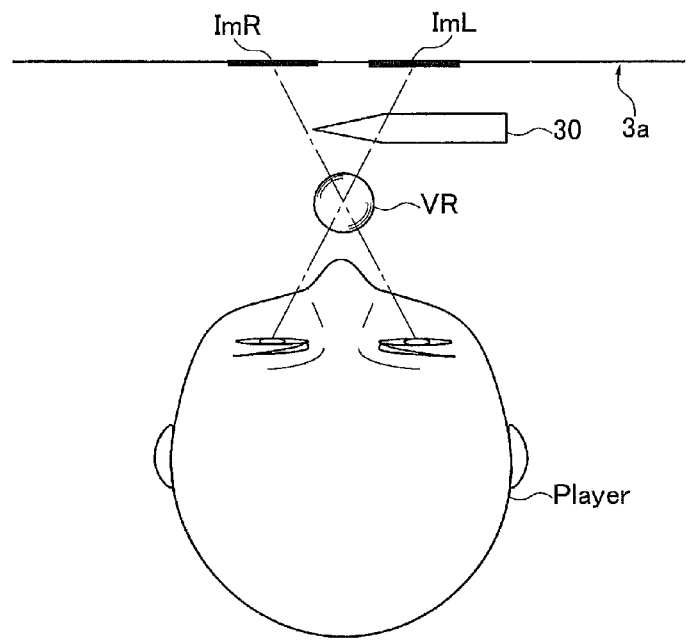
FIGS. 10A and 10B illustrate a positional relationship, which appears unnatural to the player, between the operating body and the stereoscopic image in the game device of the second embodiment.
Figure 10B:
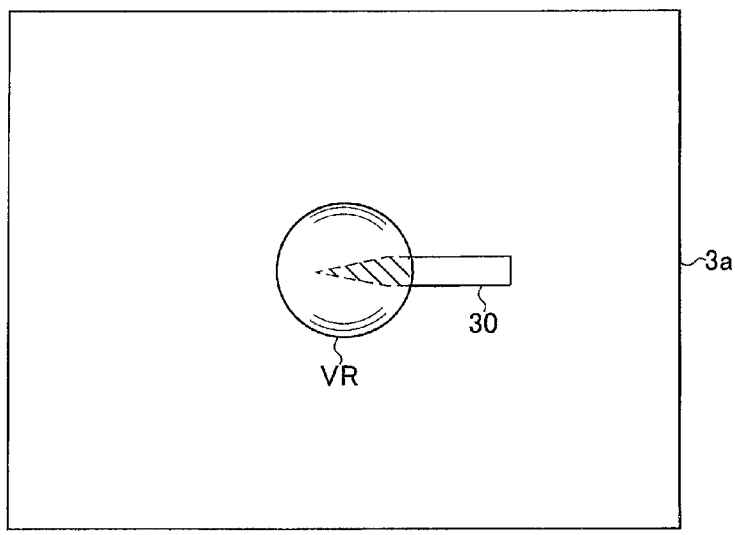

FIGS. 10A and 10B illustrate a state in which the virtual stereoscopic image recognized based on the parallax image (left eye image ImL, right eye image ImR) overlaps the operating body 30 as seen by the player and the operating body 30 and is positioned between the virtual stereoscopic image VR and the liquid crystal monitor 3a. FIG. 10A is a plan view of the above state and FIG. 10B is a view of the stereoscopic image VR and the operating body 30 as seen from the player's viewpoint. As illustrated in FIGS. 10A and 10B, when the virtual stereoscopic image VR recognized based on the parallax image overlaps the operating body 30 as seen by the player and the operating body 30 is positioned between the virtual stereoscopic image VR and the liquid crystal monitor 3a, that is when a positional relationship develops in which the operating body 30 exists further behind the virtual spatial position of the stereoscopic image VR recognized by the player, the operating body 30 can be seen in an unnatural manner through the stereoscopic image VR as seen by the player.

Specifically, only the distal end of the operating body 30 illustrated with the diagonal lines in FIG. 10B appears to float in front (on the player side) of the stereoscopic image VR. The reason for this is as follows. The stereoscopic image VR is not actually present but is present as an imaginary object configured by the human brain, whereas the operating body 30 is an actually existing object. As a result, as illustrated in FIG. 10A, when the operating body 30 crosses a line between the parallax image and human eyes, a portion of the stereoscopic image VR is not appropriately recognized due to the presence of the operating body 30.

Accordingly, the first control means 56 controls the image display means 52 so as not to previously display a parallax image that leads to the development of the above positional relationship in order to prevent such an unnatural display. Consequently, the operability with regard to a stereoscopic image by an operating body appears more natural.

Specifically, the first control means 56 is realized as described below.

The CPU 11 calculates the spatial coordinates of the points of the operating body 30 sequentially calculated in frame units. The CPU 11 then calculates a projection position on the liquid crystal monitor 3a of the spatial coordinates of the points of the operating body 30 as seen from the spatial positions (known positions) of both pupils of the player predicated when the virtual spatial position of the stereoscopic image VR is calculated by the first coordinate calculating means 53. The projection position is a position on the liquid crystal monitor 3a of the operating body 30 as seen by the player, and a region (referred to below as "projection region") on the liquid crystal monitor 3a of the operating body 30 seen by the player is defined based on this projection position. When the parallax image is not displayed on the liquid crystal monitor 3a inside the projection region of the operating body 30 to be sequentially calculated or when the parallax image is displayed on the liquid crystal monitor 3a inside the projection region of the operating body 30, the CPU 11 adjusts the amount of deviation (d in FIG. 6) between the left eye image and the right eye image of the parallax image so that the operating body 30 is not positioned behind the stereoscopic image VR as seen by the player. Specifically, the amount of deviation between the left eye image and the right eye image of the displayed parallax image is adjusted so that the stereoscopic image VR is recognized as being further to the liquid crystal monitor 3a side than the operating body 30 since the spatial coordinates of the points of the operating body 30 are understood.

The second control means 57 controls the image display means 52 so as not to display a parallax image corresponding to a stereoscopic image when the operating body 30 overlaps that stereoscopic image as seen by the player and has moved to a position between the stereoscopic image and the liquid crystal monitor 3a.

As described above, when, as a result of the movement of the operating body 30, a positional relationship (the positional relationship illustrated in FIGS. 10A and 10B) develops in which the operating body 30 is present, as seen by the player, further behind the virtual spatial position of the stereoscopic image recognized by the player, the display of the operating body 30 appears unnatural due to the stereoscopic image as seen by the player. Specifically, only the distal end of the operating body 30 overlapping the stereoscopic image appears to float in front of (on the player side) the stereoscopic image. Accordingly, the second control means 57 controls the image display means 52 so as not to display the parallax image corresponding to the stereoscopic image when the operating body 30 has moved to a position such that the above positional relationship develops. Specifically, the unnatural display is avoided by the disappearance of the stereoscopic image itself. Consequently, the operability with regard to the stereoscopic image by the operating body 30 is able to appear more natural.

Specifically, the second control means 57 is realized as described below.

The CPU 11 calculates the spatial coordinates of the points of the operating body 30 sequentially calculated in frame units. The CPU 11 then calculates the projection position on the liquid crystal monitor 3a of the spatial coordinates of the points of the operating body 30 as seen from the spatial positions (known positions) of both pupils of the player assumed when the virtual spatial position of the stereoscopic image is calculated by the first coordinate calculating means 53. The projection position is a position on the liquid crystal monitor 3a of the operating body 30 as seen by the player, and the projection region on the liquid crystal monitor 3a of the operating body 30 seen by the player is defined based on this projection position. The CPU 11 sequentially monitors the projection region of the operating body 30. When it is determined that the parallax image has moved inside the projection region and the virtual spatial position of the stereoscopic image calculated by the first coordinate calculating means 53 based on the parallax image is on the player side of the operating body 30, the display of that parallax image is prohibited.

The third control means 58 controls the image display means 52 to move a parallax image corresponding to a stereoscopic image to a position in which the stereoscopic image corresponding to the parallax image does not overlap the operating body 30 as seen by the player when the operating body 30 overlaps the stereoscopic image as seen by the player and has moved to a position between the stereoscopic image and the liquid crystal monitor 3a.

As described above, when, as a result of the movement of the operating body 30, the positional relationship develops in which the operating body 30 is present, as seen by the player, further behind the virtual spatial position of the stereoscopic image recognized by the player, the operating body 30 seen by the player is displayed unnaturally due to the stereoscopic image. Specifically, only the portion of the operating body 30 overlapping the stereoscopic image appears to float in front of (on the player side) the stereoscopic image. Accordingly, the third control means 58 controls the image display means 52 to move the parallax image corresponding to the stereoscopic image to a position in which the above positional relationship does not develop in order to prevent such an unnatural display when the operating body 30 has moved to a position such that the above positional relationship develops. Specifically, the unnatural display is avoided by causing the position of the stereoscopic image to be moved away from the operating body. Consequently, the operability with regard to the stereoscopic image by the operating body 30 is able to appear more natural.

Specifically, the third control means 58 is realized as described below.

The CPU 11 calculates the spatial coordinates of the points of the operating body 30 sequentially calculated in frame units. The CPU 11 then calculates a projection position on the liquid crystal monitor 3a of the spatial coordinates of the points of the operating body 30 as seen from the spatial positions (known positions) of both pupils of the player predicated when the virtual spatial position of the stereoscopic image is calculated by the first coordinate calculating means 53. The projection position is a position on the liquid crystal monitor 3a of the operating body 30 as seen by the player, and a projection region on the liquid crystal monitor 3a of the operating body 30 seen by the player is defined based on this projection position. The CPU 11 sequentially monitors the projection region of the operating body 30. When it is determined that the parallax image has moved inside the projection region and the virtual spatial position of the stereoscopic image calculated by the first coordinate calculating means 53 based on the parallax image is on the player side of the operating body 30, the image processing circuit 14 is instructed to move the parallax image to a region other than the projection region on the liquid crystal monitor 3a.

The fourth control means 59 controls the event generating means 55 to prohibit the generation of a certain event when, in a state in which the operating body 30 is not substantially moving, the distance between the spatial coordinates of at least one point of the stereoscopic image and the spatial coordinates of at least one point of the operating body 30 is equal to or less than a certain threshold.

The state in which the operating body 30 is not substantially moving is considered to be when there is a lack of active intention by the player to move the operating body 30 toward the stereoscopic image recognized by the player. Accordingly, the fourth control means 59 causes the event generating means 55 to prohibit the generation of a certain event when, in this case, it is determined that the distance between the spatial coordinates of at least one point of the stereoscopic image and the spatial coordinates of at least one point of the operating body 30 is equal to or less than a certain threshold, that is, the stereoscopic image and the operating body 30 are sufficiently close to each other. As a result, regardless of the active intention on the part of the player, the generation of the when the operating body and the stereoscopic image accidentally approach each other can be inhibited and the effectiveness of the event generation can be improved.

For example, in the case of the game described with reference to FIGS. 3A to 3C and 4A to 4C, if the disappearance of the stereoscopic image or the attainment of points occurs when the stereoscopic image and the operating body 30 accidentally touch or become sufficiently close to each other even though the player has not moved the operating body 30 (that is, the moving stereoscopic image becomes sufficiently close to the unmoving operating body 30), the enjoyment of the game is reduced since the disappearance of the stereoscopic image VR or the attainment of points is generated without the accompaniment of an appropriate operation by the player. Accordingly, the fourth control means 59 prevents an unsuitable event generation represented by the generation of an event without the accompaniment of a suitable operation by the player.

Specifically, the fourth control means 59 is realized as described below.

The CPU 11 calculates in frame units the movement speed of the operating body 30 on the basis of the spatial coordinates of the points that make up the operating body sequentially calculated by the second coordinate calculating means 54. Specifically, the movement speed of the operating body 30 is calculated on the basis of a change of the coordinates of the operating body 30 during one frame period. If the movement speed of the operating body 30 is equal to or greater than a certain threshold at the point in time it is determined that the operating body 30 and the stereoscopic image recognized by the player are sufficiently close to each other, the event generating means 55 is permitted to generate the certain event. If the movement speed of the operating body 30 is less than the certain threshold at that point in time, the event generating means 55 is not permitted to generate the certain event.

(3) Third Embodiment

Next, a third embodiment will be explained.

Figure 11:
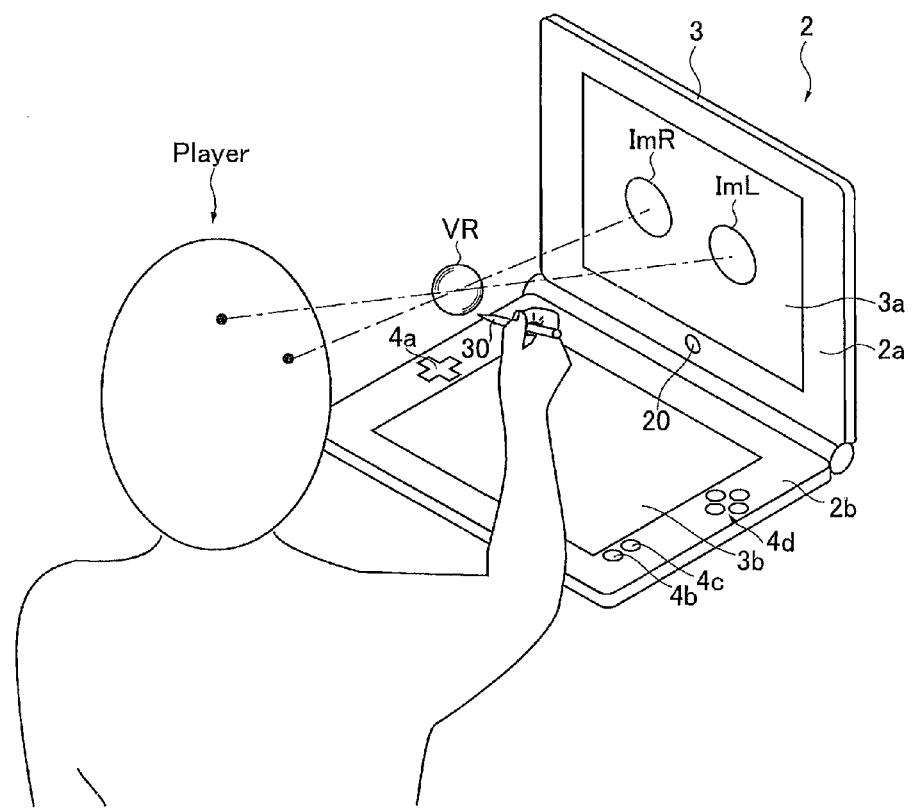
FIG. 11 illustrates a player and an appearance of a game system according to a third embodiment.
Figure 12:
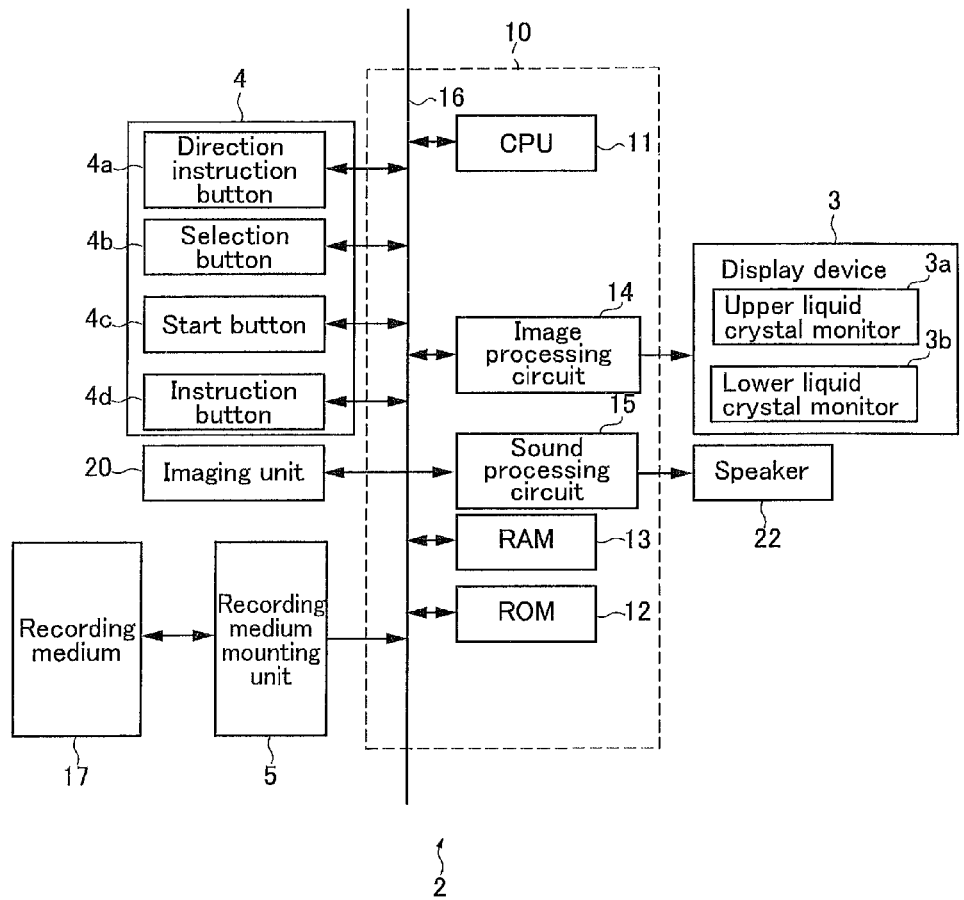
FIG. 12 is a block diagram of a game device configuration according to the third embodiment.

FIG. 11 illustrates a player of a game device 2 and an appearance of the game device 2 according to a different embodiment of the image display device of the present invention. The game device 2 is a game device that controls the progress of a game in which a player performs an operation as an object of a stereoscopic image virtually recognized by the player in the same way as the game device illustrated in FIG. 1. FIG. 12 is a block diagram illustrating a configuration of the game device 2 of the present embodiment. Elements in the block diagram illustrated in FIG. 12 that are the same as those illustrated in FIG. 2 are provided with the same reference numerals and a repetition of the explanation will be omitted. However, explanations of different parts will be provided hereinbelow for elements having functions different from those illustrated in FIG. 2 regardless of whether the same reference numeral is provided as in FIG. 2.

As illustrated in FIG. 11, the game device 2 of the present embodiment includes an upper housing 2a and a lower housing 2b. The upper housing 2a and the lower housing 2b are coupled to each other in a manner that allows for opening and closing. The display device 3 in the game device 2 of the present embodiment includes an upper liquid crystal monitor 3a provided in the upper housing 2a, and a lower liquid crystal monitor 3b provided in the lower housing 2b.

The input unit 4 includes a plurality of buttons for receiving operation inputs from the player. According to an arrangement example of the button housing illustrated in FIG. 11, the plurality of buttons are provided in the lower housing 2b and include a cross-like direction instruction button 4a arranged on the left side of the lower liquid crystal monitor 3b, and a selection button 4b, a start button 4c, and a plurality of instruction buttons 4d arranged on the right side of the lower liquid crystal monitor 3b. A power button that is not illustrated may be included in the input unit 4.

As illustrated in FIG. 11, one or a plurality of parallax images respectively made up of the left eye image ImL and the right eye image ImR are displayed on the upper liquid crystal monitor 3a, and the existence of a stereoscopic image VR between the player and the upper liquid crystal monitor 3a is recognized by the player looking at the parallax images.

A difference between the game device 2 of the present embodiment and the abovementioned game device 1 is that an imaging lens of a single imaging unit 20 facing the player as an imaging target is arranged near the center below the upper liquid crystal monitor 3a in the upper housing 2a. Specifically, unlike the game device 1, the game device 2 of the present embodiment identifies the spatial coordinates of the operating body 30 without using stereoscopic analysis on the basis of images obtained by the single imaging unit 20. Although the imaging unit 20 is housed in the game device 2 in the example illustrated in FIG. 11, a separate imaging device may be provided in a form in which the imaging device is electrically connected to the control device 10 inside the game device 2. Data of images in frame units obtained by the imaging unit 20 are sequentially sent to the CPU 11 in the control device 10.

The various means described in the functional block diagrams of FIG. 5 and FIG. 9 referred to in the first and second embodiments are realized by the configuration of the game device 2 illustrated in FIG. 11 and FIG. 12. The main difference between the hardware of the game device 2 of the present embodiment and that of the game device 1 illustrated in FIGS. 1 and 2 is that the game device 2 has a single imaging unit. Accordingly, a description of how the second coordinate calculating means 54 is executed using the single imaging unit in the present embodiment is provided hereinbelow. Among the means illustrated in FIGS. 5 and 9, explanations for means other than the second coordinate calculating means 54 will be omitted since such means have no relation to the calculation of the spatial coordinates of the operating body 30, or may be executed in the same way as the methods described in the first embodiment once the spatial coordinates of the operating body 30 are calculated.

Various conventional techniques are known for a position identification method for an object (the operating body 30 in the present embodiment) using a single image, and any of the conventional techniques may be used herein. Japanese Laid-Open Patent Publication No. H5-157518 may be raised as an example of a conventional document that discusses this type of technique and is incorporated herein by reference. An object position identification method from the above Document is roughly as described below. First, a position in the image of the characteristic point of the targeted object is identified on the basis of edge detection results of an obtained image. Next, when the characteristic point of the object or the position of a characteristic portion of the object is identified, two-dimensional coordinates of the characteristic point of the object in the obtained image are converted to coordinates on a real space (three-dimensional space) of the characteristic points of the object. In the coordinate conversion, parameters are referred to such as the size in the image of the characteristic part, the magnification rate of the image, the imaging angle, the position of the imaging unit and the like.

In the present embodiment, when identifying the shape of the operating body 30 from the obtained image, the above edge detection results may be combined with pattern recognition results based on a plurality of shapes previously recorded as the shapes of the operating body 30. Further, making a portion of the operating body 30 (e.g., the distal end) a special shape different from other parts in the obtained image is a desirable feature to allow for easy identification of the characteristic part of the operating body 30. In this case, the distal end of the operating body 30 becomes the characteristic part. More preferably, by making the distal end a different color than another part, the characteristic part of the operating body 30 can be quickly and easily identified from brightness information in the obtained image.

Embodiments of the present invention have been explained in detail. However, the present invention is not limited to the aforementioned embodiments. Further, it is apparent that a variety of changes and modifications can be made for the respective exemplary embodiments without departing from the scope of the present invention.

For example, although the operating body 30 is described as a long and rod-like pen and the like that is a physical substance separate from the player in the abovementioned embodiments, the present invention is not limited as such. The operating body may be a physical substance that is a portion of the player such as a finger or a hand of the player. For example, when a hand of the player is used as the operating body, a position of the hand as the operating body can be obtained from the images by implementing an algorithm that performs shape recognition of the hand from pixels having the brightness information of the color of skin among the image obtained by the imaging unit of the game device. The spatial coordinates of the hand as the operating body may be calculated from the position of the hand in the image.

Although the description in the above embodiments focuses on an image display device of the present invention used in the game device, the image display device may be used in an application other than a game device. As an example of an application of the image display device of the present invention other than an application for a game device, the image display device may be made to function as an input device so that a viewer performs an input with respect to the image display device using a method in which the viewer performs a pseudo input operation on a recognized stereoscopic image between the viewer and the display screen.

Although the game illustrated in FIGS. 3A to 3C and 4A to 4C has been described as an example in the above embodiments, this game is merely one example for illustrating an application example of the present invention, and the present invention may be used in various applications. Specifically, any type of game other than the game exemplified in FIGS. 3 and 4 may be used as a game executed by the game device as the image display device of the present invention so long as the game accompanies an act of a player using an operating body to directly operate on a stereoscopic image recognized by the player.

For example, the game may be a communication game in which a parallax image corresponding to an animal (pet) as the stereoscopic image is made to change in such a way that the animal as the stereoscopic image is recognized to perform a certain action due to the player performing an act to touch (a pseudo caressing act) the animal recognized as the stereoscopic image using a touch pen as the operating body.

Furthermore, the game may be a baseball game in which a parallax image corresponding to a ball as the stereoscopic image is made to change in such a way that the ball as the stereoscopic image is recognized as moving due to the player performing an act to touch (a pseudo hitting act) the ball recognized as the stereoscopic image using the touch pen as the operating body like a bat.

The game may also be a role playing game that includes an action to change a parallax image corresponding to a treasure chest as the stereoscopic image in such a way that the treasure chest as the stereoscopic image is recognized as being opened due to the player performing an act to touch (seemingly selecting and opening the treasure chest) the treasure chest recognized as the stereoscopic image using a touch pen as the operating body.

LIST OF REFERENCE NUMERALS 1, 2: Game device
3: Display device
3a: Liquid crystal monitor, upper liquid crystal monitor
3b: Lower liquid crystal monitor
4: Input unit
5: Storage medium mounting unit
10: Control device
11: CPU
12: ROM
13: RAM
14: Image processing circuit
15: Sound processing circuit
16: Bus
17: Storage medium
20: Imaging unit
20L: Left imaging unit
20R: Right imaging unit
22: Speaker
51: Game progression means
52: Image display means
53: First coordinate calculating means
54: Second coordinate calculating means
55: Event generating means
56: First control means
57: Second control means
58: Third control means
59: Fourth control means

The invention claimed is:

1. An image display device, comprising:
an image processing circuit configured to display a parallax image on a display screen; and
a processor configured to control the image processing circuit, the processor configured to perform:
calculating virtual spatial coordinates of a stereoscopic image to be recognized by a viewer of the parallax image;
calculating spatial coordinates of an operating body to be operated by the viewer;
generating a certain event accompanying a change of at least one of the parallax image or an image on the display screen other than the parallax image when a distance between the spatial coordinates of at least one point of the stereoscopic image that have been calculated and the spatial coordinates of at least one point of the operating body that have been calculated is equal to or less than a certain threshold; and
controlling the image processing circuit so as not to display the parallax image beforehand, when, before the parallax image is displayed, the virtual stereoscopic image recognized based on the parallax image overlaps the operating body as seen by the viewer and the operating body is determined to be positioned between the virtual stereoscopic image and the display screen.

2. The image display device according to claim 1, wherein the processor is further configured to prohibit the generation of a certain event when, in a state in which the operating body is not substantially moving, when the distance between the spatial coordinates of at least one point of the stereoscopic image and the spatial coordinates of at least one point of the operating body is equal to or less than a certain threshold.

3. The image display device according to claim 1, wherein:
a distal end of the operating body is configured in a color and/or a shape that is different from a part other than the distal end; and
the processor is further configured to generate the certain event when a distance between the spatial coordinates of at least one point of the stereoscopic image that have been calculated and the spatial coordinates of at least one point of the distal end of the operating body that have been calculated is equal to or less than a certain threshold.

4. An image display device, comprising:
an image processing circuit configured to display a parallax image on a display screen; and
a processor configured to control the image processing circuit, the processor configured to perform:
calculating virtual spatial coordinates of a stereoscopic image to be recognized by a viewer of the parallax image;

calculating spatial coordinates of an operating body to be operated by the viewer;

generating a certain event accompanying a change of at least one of the parallax image or an image on the display screen other than the parallax image when a distance between the spatial coordinates of at least one point of the stereoscopic image that have been calculated and the spatial coordinates of at least one point of the operating body that have been calculated is equal to or less than a certain threshold; and controlling the image processing circuit so as not to display the parallax image corresponding to the stereoscopic image, when the operating body overlaps the stereoscopic image as seen by the viewer and the operating body has moved to a position between the stereoscopic image and the display screen.

5. The image display device according to claim 4, wherein the processor is further configured to prohibit the generation of a certain event when, in a state in which the operating body is not substantially moving, when the distance between the spatial coordinates of at least one point of the stereoscopic image and the spatial coordinates of at least one point of the operating body is equal to or less than a certain threshold.

6. The image display device according to claim 4, wherein:
a distal end of the operating body is configured in a color and/or a shape that is different from a part other than the distal end; and
the processor is further configured to generate the certain event when a distance between the spatial coordinates of at least one point of the stereoscopic image that have been calculated and the spatial coordinates of at least one point of the distal end of the operating body that have been calculated is equal to or less than a certain threshold.

7. An image display device, comprising:
an image processing circuit configured to display a parallax image on a display screen; and
a processor configured to control the image processing circuit, the processor configured to perform:
calculating virtual spatial coordinates of a stereoscopic image to be recognized by a viewer of the parallax image;
calculating spatial coordinates of an operating body to be operated by the viewer;
generating a certain event accompanying a change of at least one of the parallax image or an image on the display screen other than the parallax image, when a distance between the spatial coordinates of at least one point of the stereoscopic image that have been calculated and the spatial coordinates of at least one point of the operating body that have been calculated is equal to or less than a certain threshold; and
controlling the image processing circuit to move the parallax image corresponding to the stereoscopic image to a position in which the stereoscopic image corresponding to the parallax image does not overlap the operating body as seen by the viewer, when the operating body overlaps the stereoscopic image as seen by the viewer and the operating body has moved to a position between the stereoscopic image and the display screen.

8. The image display device according to claim 7, wherein the processor is further configured to prohibit the generation of a certain event when, in a state in which the operating body is not substantially moving, when the distance between the spatial coordinates of at least one point of the stereoscopic image and the spatial coordinates of at least one point of the operating body is equal to or less than a certain threshold.

9. The image display device according to claim 7, wherein:
a distal end of the operating body is configured in a color and/or a shape that is different from a part other than the distal end; and
the processor is further configured to generate the certain event when a distance between the spatial coordinates of at least one point of the stereoscopic image that have been calculated and the spatial coordinates of at least one point of the distal end of the operating body that have been calculated is equal to or less than a certain threshold.

10. An image display device, comprising:
an image processing circuit configured to display a parallax image on a display screen; and
a processor configured to control the image processing circuit, the processor configured to perform:
calculating virtual spatial coordinates of a stereoscopic image to be recognized by a viewer of the parallax image;
calculating spatial coordinates of an operating body to be operated by the viewer;
generating a certain event accompanying a change of at least one of the parallax image or an image on the display screen other than the parallax image when a distance between the spatial coordinates of at least one point of the stereoscopic image that have been calculated and the spatial coordinates of at least one point of the operating body that have been calculated is equal to or less than a certain threshold; and
controlling the image processing circuit so as not to display the parallax image beforehand, when, before the parallax image is displayed, the virtual stereoscopic image recognized based on the parallax image overlaps the operating body as seen by the viewer and the operating body is determined to be positioned between the virtual stereoscopic image and the display screen,
the calculating virtual spatial coordinates of the stereoscopic image calculates virtual spatial coordinates of the stereoscopic image corresponding to the parallax image on the basis of an amount of deviation of a left eye image and a right eye image that make up the parallax image, a first distance between the viewer and the display screen, and a second distance previously set as a distance between the pupils of the viewer; and
the calculating spatial coordinates of the operating body calculates the spatial coordinates of the operating body on the basis of a color and/or a shape of an image of the operating body obtained by one or a pair of imaging units.

11. A game control method for a game device that controls progress of a game in which a player performs an operation on an object as a stereoscopic image virtually recognized by the player, the method comprising:
displaying a parallax image on a display screen;
calculating virtual spatial coordinates of a stereoscopic image to be recognized by the player viewing the parallax image;
calculating spatial coordinates of an operating body to be operated by the player;
generating a certain event accompanying a change of at least one of the parallax image and an image on the display screen other than the parallax image when a distance between the spatial coordinates of at least one point of the stereoscopic image that have been calculated and the spatial coordinates of at least one point of the operating body that have been calculated is equal to or less than a certain threshold; and controlling such that the parallax image is not displayed beforehand, when, before the parallax image is displayed, the virtual stereoscopic image recognized based on the parallax image overlaps the operating body as seen by the viewer and the operating body is determined to be positioned between the virtual stereoscopic image and the display screen.

12. A non-transitory computer readable storage medium having computer executable instructions stored thereon that, when executed by a computer, cause the computer to:

display a parallax image on a display screen;

calculate virtual spatial coordinates of a stereoscopic image recognized by the player viewing the parallax image;

calculate spatial coordinates of an operating body to be operated by the player;

generate a certain event accompanying a change of at least one of the parallax image and an image on the display screen other than the parallax image when a distance between the calculated spatial coordinates of at least one point of the stereoscopic image and the calculated spatial coordinates of at least one point of the operating body is equal to or less than a certain threshold; and control such that the parallax image is not displayed beforehand, when, before the parallax image is displayed, the virtual stereoscopic image recognized based on the parallax image overlaps the operating body as seen by the viewer, and the operating body is determined to be positioned between the virtual stereoscopic image and the display screen.

13. A game control method for a game device that controls progress of a game in which a player performs an operation on an object as a stereoscopic image virtually recognized by the player, the method comprising:

displaying a parallax image on a display screen;

calculating virtual spatial coordinates of a stereoscopic image to be recognized by a viewer of the parallax image;

calculating spatial coordinates of an operating body to be operated by the viewer;

generating a certain event accompanying a change of at least one of the parallax image or an image on the display screen other than the parallax image when a distance between the spatial coordinates of at least one point of the stereoscopic image that have been calculated and the spatial coordinates of at least one point of the operating body that have been calculated is equal to or less than a certain threshold; and controlling so as not to display the parallax image corresponding to the stereoscopic image, when the operating body overlaps the stereoscopic image as seen by the viewer and the operating body has moved to a position between the stereoscopic image and the display screen.

14. A non-transitory computer readable storage medium having computer executable instructions stored thereon that, when executed by a computer, cause the computer to:

display a parallax image on a display screen;

calculate virtual spatial coordinates of a stereoscopic image to be recognized by a viewer of the parallax image;

calculate spatial coordinates of an operating body to be operated by the viewer;

generate a certain event accompanying a change of at least one of the parallax image or an image on the display screen other than the parallax image when a distance between the spatial coordinates of at least one point of the stereoscopic image that have been calculated and the spatial coordinates of at least one point of the operating body that have been calculated is equal to or less than a certain threshold; and control so as not to display the parallax image corresponding to the stereoscopic image, when the operating body overlaps the stereoscopic image as seen by the viewer and the operating body has moved to a position between the stereoscopic image and the display screen.

15. A game control method for a game device that controls progress of a game in which a player performs an operation on an object as a stereoscopic image virtually recognized by the player, the method comprising:

displaying a parallax image on a display screen;

calculating virtual spatial coordinates of a stereoscopic image to be recognized by a viewer of the parallax image;

calculating spatial coordinates of an operating body to be operated by the viewer;

generating a certain event accompanying a change of at least one of the parallax image or an image on the display screen other than the parallax image, when a distance between the spatial coordinates of at least one point of the stereoscopic image that have been calculated and the spatial coordinates of at least one point of the operating body that have been calculated is equal to or less than a certain threshold; and controlling to move the parallax image corresponding to the stereoscopic image to a position in which the stereoscopic image corresponding to the parallax image does not overlap the operating body as seen by the viewer, when the operating body overlaps the stereoscopic image as seen by the viewer and the operating body has moved to a position between the stereoscopic image and the display screen.

16. A non-transitory computer readable storage medium having computer executable instructions stored thereon that, when executed by a computer, cause the computer to:

display a parallax image on a display screen;

calculate virtual spatial coordinates of a stereoscopic image to be recognized by a viewer of the parallax image;

calculate spatial coordinates of an operating body to be operated by the viewer;

generate a certain event accompanying a change of at least one of the parallax image or an image on the display screen other than the parallax image, when a distance between the spatial coordinates of at least one point of the stereoscopic image that have been calculated and the spatial coordinates of at least one point of the operating body that have been calculated is equal to or less than a certain threshold; and control to move the parallax image corresponding to the stereoscopic image to a position in which the stereoscopic image corresponding to the parallax image does not overlap the operating body as seen by the viewer, when the operating body overlaps the stereoscopic image as seen by the viewer and the operating body has moved to a position between the stereoscopic image and the display screen.

* * * * *